(12) United States Patent
Sheets, Jr.

(10) Patent No.: US 11,530,899 B2
(45) Date of Patent: Dec. 20, 2022

(54) LOCKING ADJUSTMENT ASSEMBLY AND METHOD FOR AN OPTICAL AIMING DEVICE

(71) Applicant: PRIMARY ARMS, LLC, Houston, TX (US)

(72) Inventor: Robert E Sheets, Jr., Houston, TX (US)

(73) Assignee: PRIMARY ARMS, LLC, Houston, TX (US)

( * ) Notice: Subject to any disclaimer, the term of this patent is extended or adjusted under 35 U.S.C. 154(b) by 281 days.

(21) Appl. No.: 16/746,761

(22) Filed: Jan. 17, 2020

(65) Prior Publication Data
US 2020/0232763 A1 Jul. 23, 2020

Related U.S. Application Data

(60) Provisional application No. 62/794,451, filed on Jan. 18, 2019.

(51) Int. Cl.
*G02B 23/00* (2006.01)
*F41G 1/38* (2006.01)
*G02B 23/16* (2006.01)

(52) U.S. Cl.
CPC ............... *F41G 1/38* (2013.01); *G02B 23/16* (2013.01)

(58) Field of Classification Search
CPC .......... G02B 23/00; G02B 23/16; F41G 1/00; F41G 1/02; F41G 1/033; F41G 1/16; F41G 1/24; F41G 1/26; F41G 1/28; F41G 1/38; F41G 1/20; F41G 1/387; F41G 11/001–008

USPC ................................ 359/399–428, 694–706
See application file for complete search history.

(56) References Cited

U.S. PATENT DOCUMENTS

| | | | |
|---|---|---|---|
| 6,691,447 B1 | 2/2004 | Ottoman | |
| 8,006,429 B2 | 8/2011 | Windauer | |
| 8,104,217 B2* | 1/2012 | Huber | F41G 1/38 |
| | | | 359/410 |
| 8,166,696 B2 | 5/2012 | Hamilton | |
| 8,312,667 B2* | 11/2012 | Thomas | F41G 1/18 |
| | | | 42/122 |
| 8,490,317 B2* | 7/2013 | Adkins | F41G 1/38 |
| | | | 42/135 |
| 8,516,736 B2 | 8/2013 | Windauer | |
| 8,806,798 B2 | 8/2014 | Crispin | |
| 9,170,068 B2 | 10/2015 | Crispin | |
| 9,182,773 B2 | 11/2015 | Campean | |
| 9,188,408 B2 | 11/2015 | Huynh | |
| 9,435,609 B2 | 9/2016 | Hamilton | |
| 9,665,120 B2 | 5/2017 | Windauer | |
| 10,101,122 B2 | 10/2018 | Davidson et al. | |
| 10,190,848 B2 | 1/2019 | VanBecelaere | |
| 10,302,394 B2 | 5/2019 | Ding et al. | |
| 11,320,241 B2* | 5/2022 | Hamilton | F41G 1/38 |
| 2009/0044660 A1 | 2/2009 | Bonis | |

(Continued)

*Primary Examiner* — Thong Q Nguyen
(74) *Attorney, Agent, or Firm* — The Compton Law Firm, P.C.; Scott D. Compton

(57) ABSTRACT

The application is directed to a locking adjustment assembly for an optical aiming device. The locking adjustment assembly is usable across different optical platforms regardless of the focal length of a particular optical platform. The locking adjustment assembly is operationally configured to be reset to a zero position. The locking adjustment assembly may also provide an automatic lock at a zero position.

10 Claims, 21 Drawing Sheets

(56) References Cited

U.S. PATENT DOCUMENTS

2016/0123704 A1   5/2016   Crispin
2017/0205195 A1   7/2017   Sheets, Jr. et al.
2019/0128642 A1   5/2019   David et al.

* cited by examiner

LOCKING ADJUSTMENT ASSEMBLY AND METHOD FOR AN OPTICAL AIMING DEVICE

CROSS-REFERENCE TO RELATED APPLICATIONS

This application claims benefit of U.S. Provisional Patent Application Ser. No. 62/794,451, filed on Jan. 18, 2019, the content of which is hereby incorporated by reference in its entirety.

STATEMENT REGARDING FEDERALLY SPONSORED RESEARCH OR DEVELOPMENT

Not applicable.

FIELD OF THE DISCLOSURE

The application relates generally to a rotatable adjustment assembly and mechanisms for changing a setting of an optical aiming device such as a riflescope, telescope or other optical device.

BACKGROUND OF THE DISCLOSURE

An optical aiming device such as a riflescope is often equipped with one or more rotatable adjustment knobs (also referred to as "turret knobs," "turrets" or "adjustment turrets") that are used to adjust settings such as elevation (e.g., an elevation turret) and windage (e.g., a windage turret) affecting the respective vertical and horizontal aim of a rifle. As an example, due to gravitational forces the angular position of a riflescope with respect to a rifle barrel must be adjusted to compensate for changes in bullet drop to accurately hit a target at varying distances. As such, shooters often establish a baseline or "zero position" for a rifle by adjusting the elevation turret so that the point of impact of bullets fired from the rifle hit a target at a known distance according to a reticle of a riflescope thereby establishing a zero angular position of a riflescope and a baseline setting or "zero position" of its elevation turret. A common distance for establishing a zero position for a rifle and elevation turret is a short distance such as fifty yards or one hundred yards from a rifle (herein referred to as a "zero distance"). When firing bullets at targets further away than the zero distance, the elevation turret may be adjusted to compensate for an increase in bullet drop. Afterward, the elevation turret may be reset back to the zero position (or "zero point" or "zero location") as desired.

Some commercially available turrets allow for a riflescope to be reset to a zero position by providing a stop type mechanism for stopping rotation of a turret at its zero position. However, such turrets typically include structural features involving complicated procedures or mechanisms. For example, common turret locking mechanisms employ elongated pin type members susceptible to failure over time. Common stop type mechanisms may also prevent inadvertent adjustment of a turret rotationally beyond its zero point. However, such stop type mechanisms can be overcome whereby, due to the threaded nature of common turrets, over rotation of a turret may result in overtightening of the turret or binding of its internal threads.

Overcoming the above shortcomings is desired.

SUMMARY OF THE DISCLOSURE

The present application is directed to a turret assembly for an optical aiming device including (1) an adjustable assembly including a cap assembly; and (2) a locking lever assembly including a pivotal locking lever operationally configured to engage the cap assembly providing a locked position of the turret assembly; wherein the cap assembly is operationally configured to direct the pivotal locking lever to a disengaged position providing an unlocked position of the turret assembly.

The present application is also directed to a turret assembly for an optical aiming device including (1) an adjustable assembly including a cap assembly with a radially disposed slot including opposing sidewalls; and (2) a locking lever assembly including a pivotal locking lever operationally configured to engage the opposing sidewalls of the slot providing a locked position of the turret assembly; wherein the cap assembly includes a push button operationally configured to direct the pivotal locking lever to a disengaged position providing an unlocked position of the turret assembly.

The present application is also directed to a turret assembly for an optical aiming device including (1) an adjustable assembly including a cap assembly; and (2) a locking system including a biased pivotal locking lever operationally configured to engage the cap assembly providing a locked position of the turret assembly; wherein the locking system includes a push button operationally configured to direct the biased pivotal locking lever apart from the cap assembly providing an unlocked position of the turret assembly.

DEFINITIONS USED IN THE DISCLOSURE

Figure 1:
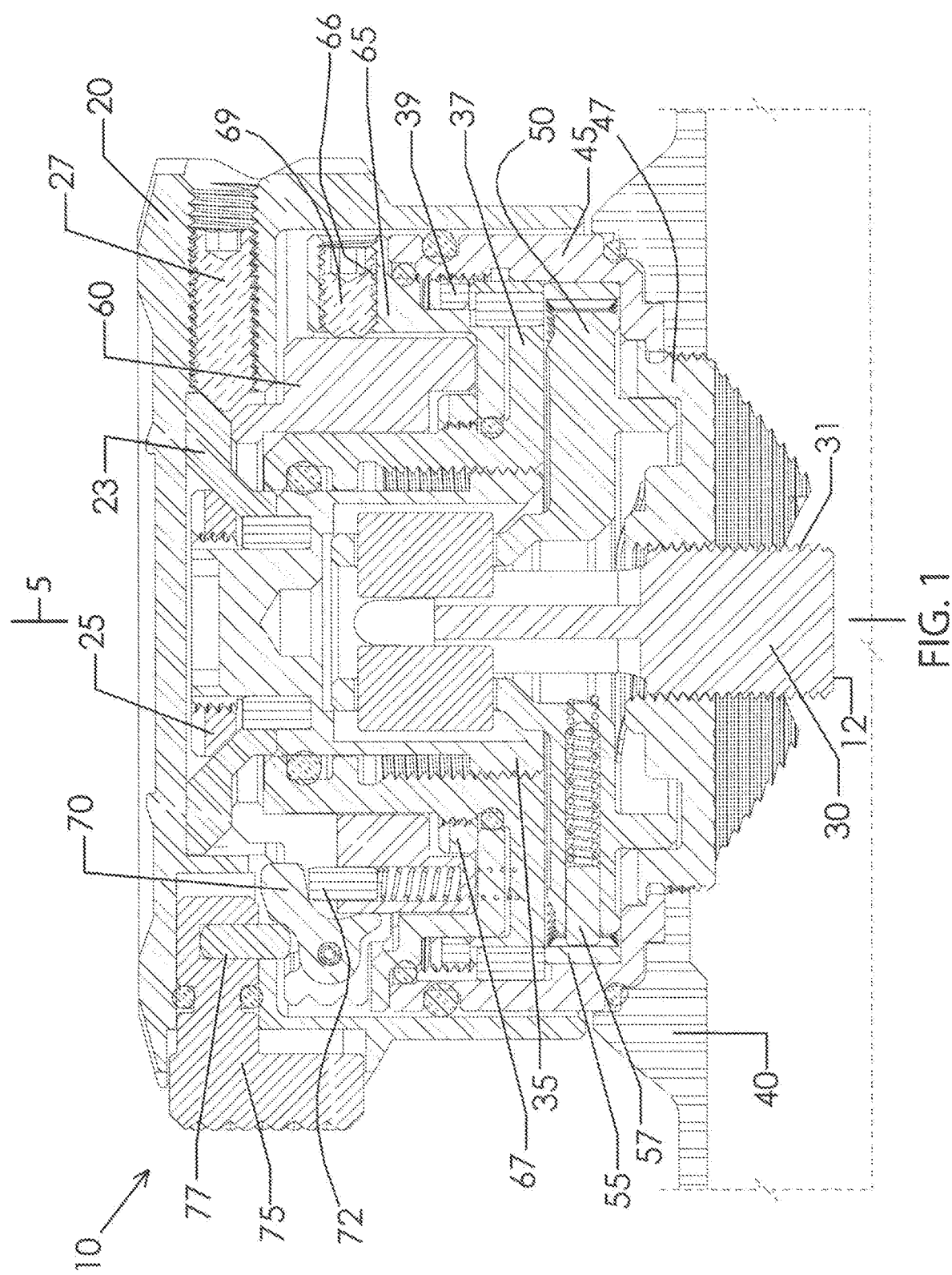
FIG. 1 is a side cross-sectional view of an embodiment of a locking adjustment assembly of the present application secured to a riflescope with the locking adjustment assembly set at its lowest position.

The term "at least one", "one or more", and "one or a plurality" mean one thing or more than one thing with no limit on the exact number; these three terms may be used interchangeably within this application. For example, at least one device means one or more devices or one device and a plurality of devices.

The term "about" means that a value of a given quantity is within ±20% of the stated value. In other embodiments, the value is within ±15% of the stated value. In other embodiments, the value is within ±10% of the stated value. In other embodiments, the value is within ±7.5% of the stated value. In other embodiments, the value is within ±5% of the stated value. In other embodiments, the value is within ±2.5% of the stated value. In other embodiments, the value is within ±1% of the stated value.

The term "substantially" or "essentially" means that a value of a given quantity is within ±10% of the stated value. In other embodiments, the value is within ±7.5% of the stated value. In other embodiments, the value is within ±5% of the stated value. In other embodiments, the value is within ±2.5% of the stated value. In other embodiments, the value is within ±1% of the stated value. In other embodiments, the value is within ±0.5% of the stated value. In other embodiments, the value is within +0.1% of the stated value.

DETAILED DESCRIPTION OF THE DISCLOSURE

For the purposes of promoting an understanding of the principles of the disclosure, reference is now made to the embodiments illustrated in the drawings and particular language will be used to describe the same. It is understood that no limitation of the scope of the claimed subject matter is intended by way of the disclosure. As understood by one skilled in the art to which the present disclosure relates, various changes and modifications of the principles as described and illustrated are herein contemplated.

Before describing the invention in detail, it is to be understood that the terminology used herein is for the purpose of describing particular embodiments only, and is not intended to be limiting. As used in this specification and the appended claims, the term "optical platform" refers to a firearm sighting device comprising one or more lens elements. The terms "turret assembly," "turret knob assembly" and "locking turret assembly" may be used interchangeably. Herein, a "projectile launching device" may include, but is not necessarily limited to a firearm and a crossbow. Herein, a "firearm" may include, but is not necessarily limited to a rifle, a shotgun, a pistol, a shoulder fired bazooka, a shoulder fired rocket launcher, an air rifle, and a paintball gun.

In one embodiment, the application provides a locking adjustment assembly for an optical platform mounted to a projectile launching device having a low profile design. In another embodiment, the application provides a locking adjustment assembly for a firearm having a low profile design. In one embodiment, the locking adjustment assembly may be compact and/or lightweight and/or dimensionally scalable.

In another embodiment, the application provides a locking adjustment assembly with a novel zero stop design, the zero stop design may include a solid stop at a defined zero position.

In another embodiment, the application provides a locking adjustment assembly with a tactile automatic lock at a zero setting. The locking adjustment assembly is mechanically lockable and can be manually unlocked by an individual when a change in setting of the locking adjustment assembly is desired.

In another embodiment, the application provides a locking adjustment assembly with a novel locking mechanism including a lever assembly with a contact surface as opposed to elongated pins known in the art that are susceptible to failure. In certain embodiments, the contact surface includes flat or planar areas, while in other embodiments, the contact surface is flat or planar or substantially flat or planar.

In another embodiment, the application provides a mechanism for re-zeroing a locking adjustment assembly without the use of shims, winding or other complicated steps or procedures.

In another embodiment, the application provides a locking adjustment assembly including allowable clicks past a zero position of the locking adjustment assembly.

In another embodiment, the application provides a locking adjustment assembly with allowable clicks past a zero position including a built in stop mechanism.

In another embodiment, the application provides a locking adjustment assembly with dual jacking screws configured in a manner whereby the locking adjustment assembly may be used with multiple different optical platforms.

In another embodiment, the application provides a locking adjustment assembly including a plurality of moveable members rotatable about a common axis and a plurality of fixed members, wherein rotation of the moveable members changes the linear position of the moveable members, wherein the locking adjustment assembly may be adjusted to provide a desired starting position of the locking adjustment assembly, and wherein the locking adjustment assembly includes a locking member secured to a fixed member operationally configured to automatically stop the moveable members at the desired starting position.

In another embodiment, the application provides a locking adjustment assembly including (1) an adjustable assembly defining an axis of the locking adjustment assembly providing linear movement of the locking adjustment assembly along the axis; and (2) a lever type locking assembly operationally configured to engage a cap assembly of the adjustable assembly providing a locked position of the locking adjustment assembly, the cap assembly being operationally configured to direct the lever type locking assembly to a disengaged position providing an unlocked position of the locking adjustment assembly; wherein the locked position of the lever type locking assembly defines a zero stop position of the locking adjustment assembly.

In another embodiment, the application provides a locking adjustment assembly having a novel pivotal locking member for engaging a turret cap of the locking adjustment assembly. The present application is also directed to a locking adjustment assembly with threaded members providing linear movement of the locking adjustment assembly, the threaded members having a design providing for use of the locking adjustment assembly across multiple optical platforms. The present application is also directed to a method of adjusting the elevational settings of a riflescope using the locking adjustment assembly described herein.

Figure 2:
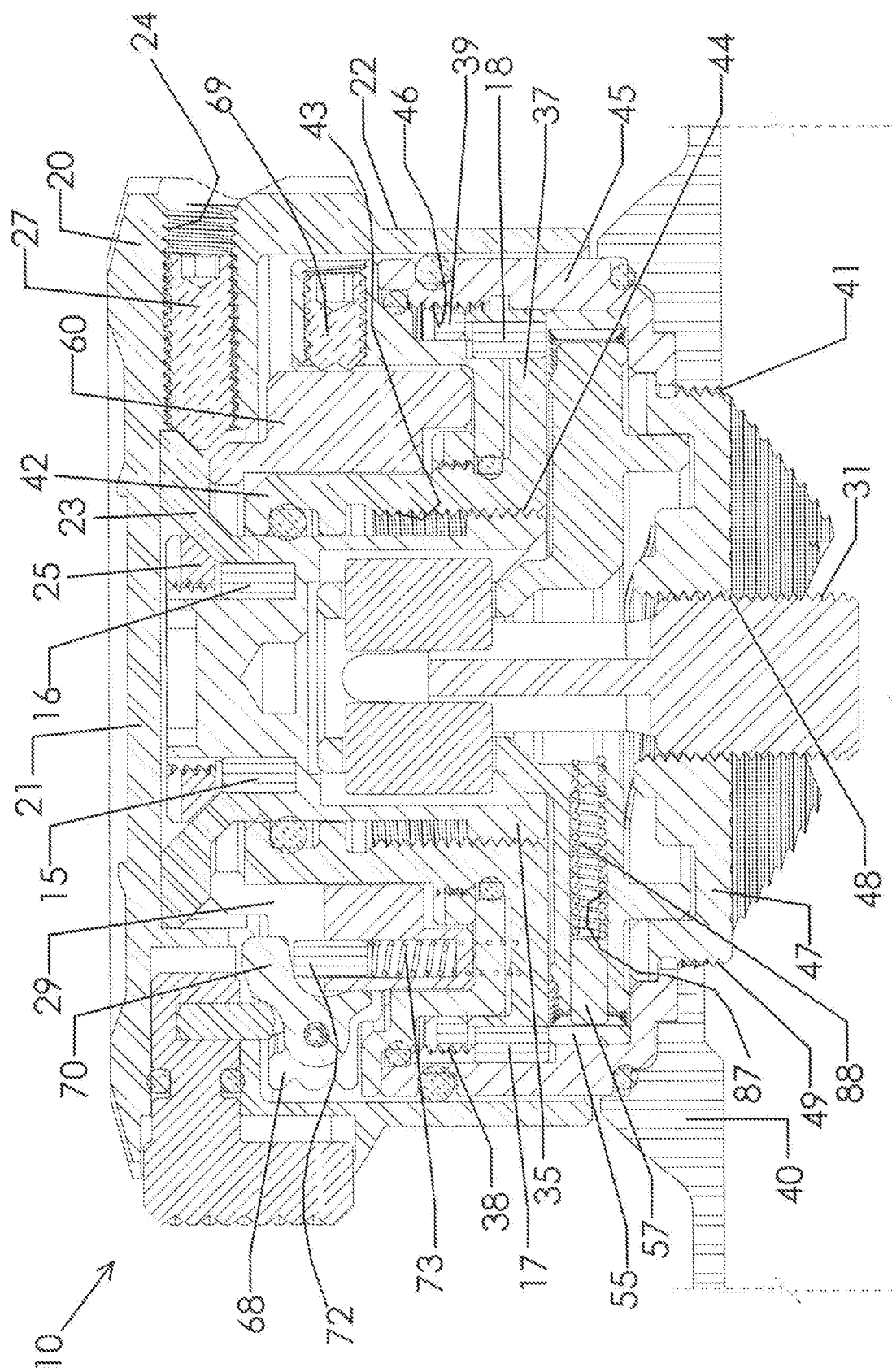
FIG. 2 is another side cross-sectional view of the locking adjustment assembly of FIG. 1.
Figure 26:
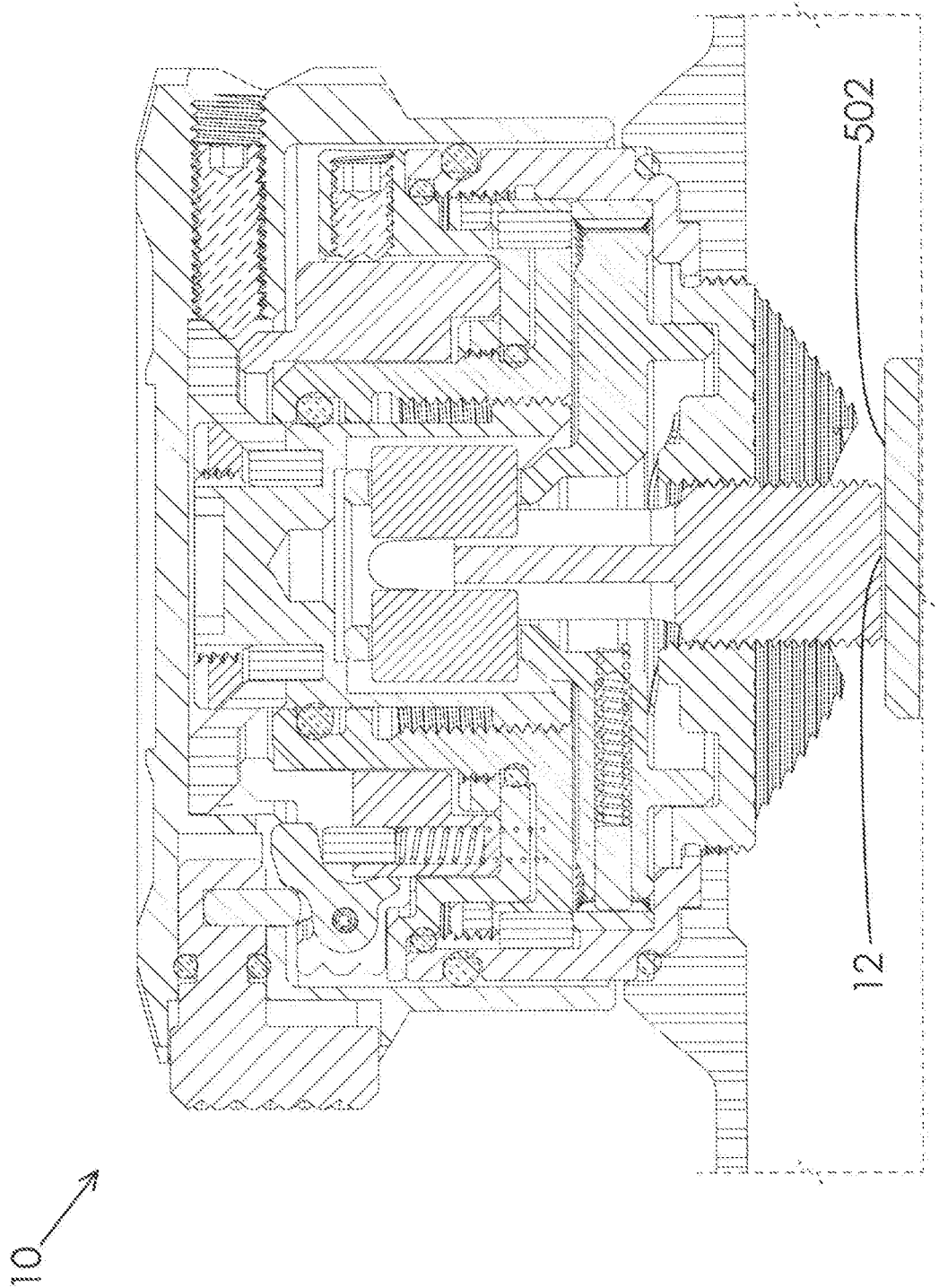
FIG. 26 is another side cross-sectional view of the locking adjustment assembly of FIG. 1.
Figure 27:
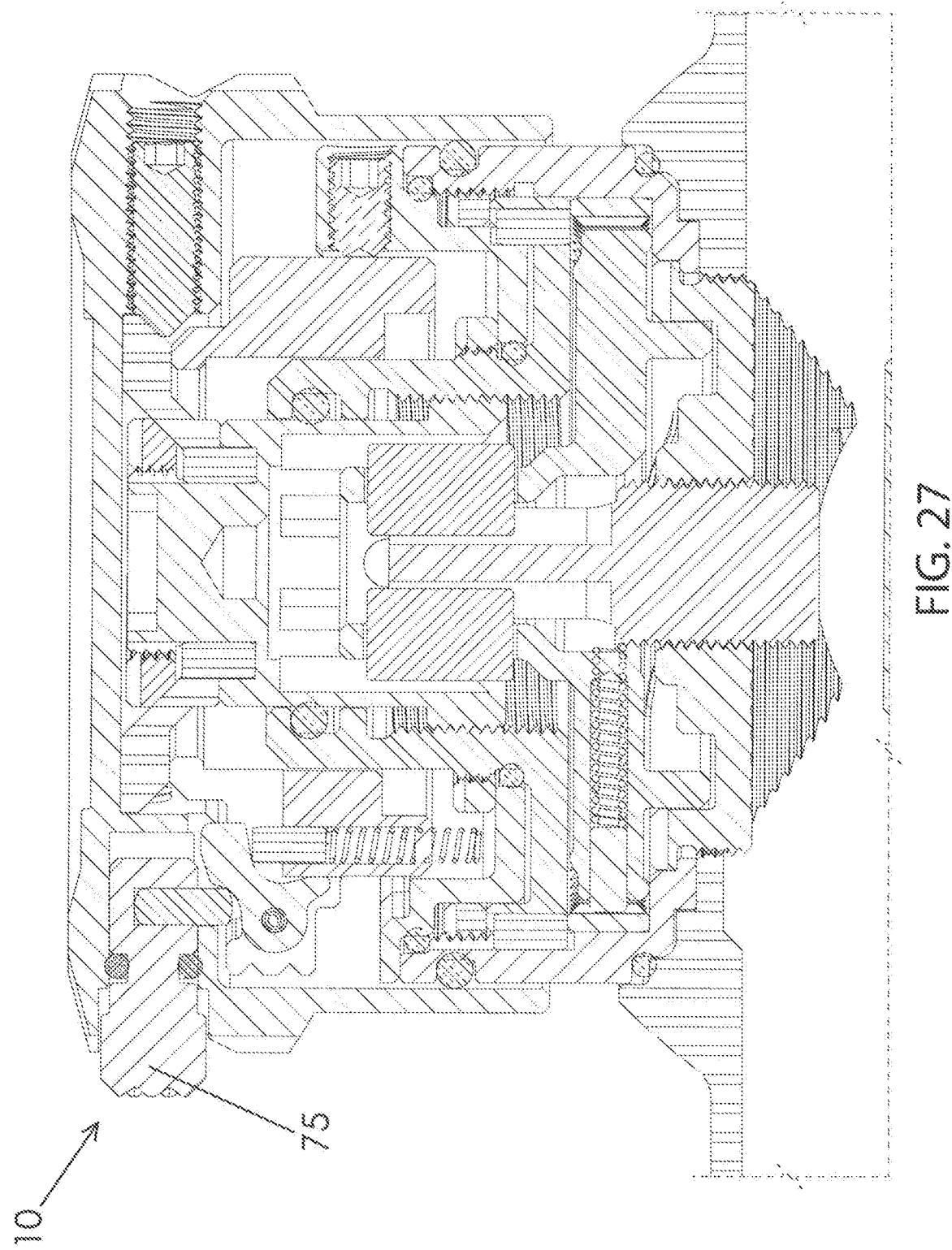
FIG. 27 is a side cross-sectional view of another embodiment of a locking adjustment assembly of the present application.

Referring to FIGS. 1 and 2, an embodiment of the present locking adjustment assembly 10 (hereafter "turret assembly 10") for use with an optical aiming device, including but not necessarily limited to a riflescope 500 is provided. The turret assembly 10 includes what may be referred to herein as an "adjustable assembly" of moveable members including at least an outer cap member 20 (or "turret cap 20") and threaded members including a first adjustment member 30 ("first jacking screw 30" or "primary jacking screw 30") and a second adjustment member 35 ("second jacking screw 35" or "secondary jacking screw 35"), each of which rotates about rotational axis 5 of the turret assembly 10 and may be directed along rotational axis 5 in either direction. The first jacking screw 30 has an outer threaded surface 31 and a planar first end 12 for contacting a contact surface 502 of an adjustable member of an optical aiming device (see FIG. 26).

The turret assembly 10 further includes a base assembly or main seat assembly threadedly matable to an annular main tube member 40 (or "main body 40") of an optical aiming device, including but not necessarily limited to a riflescope 500. The main seat assembly includes an annular main seat member 45 and an annular retaining ring 47, the retaining ring 47 having (1) an inner threaded surface 48 in threaded communication with the outer threaded surface 31 of the first jacking screw 30 and (2) an outer threaded surface 49 in threaded communication with the threaded surface 41 of the main body 40. As shown in FIG. 2, the main seat member 45 includes an inner threaded surface 46 for threaded communication with an outer threaded surface 38 of a retaining ring 39 of an annular sleeve member or "second jacking screw sleeve 37." As shown, the second jacking screw sleeve 37 includes a cylindrical portion 42 having an inner threaded surface 43 in threaded communication with an outer threaded surface 44 of the secondary jacking screw 35.

Surrounding the cylindrical portion 42 of the second jacking screw sleeve 37 is a locking lever carrier member 60, an annular seat member 65, and a retaining ring 67 in abutment with part of the annular seat member 65. The annular seat member 65 includes at least one radial threaded borehole 66 for receiving a threaded set screw 69 therein in a manner effective to secure the locking lever carrier member 60 in a fixed position during operation of the turret assembly 10.

Figure 3:
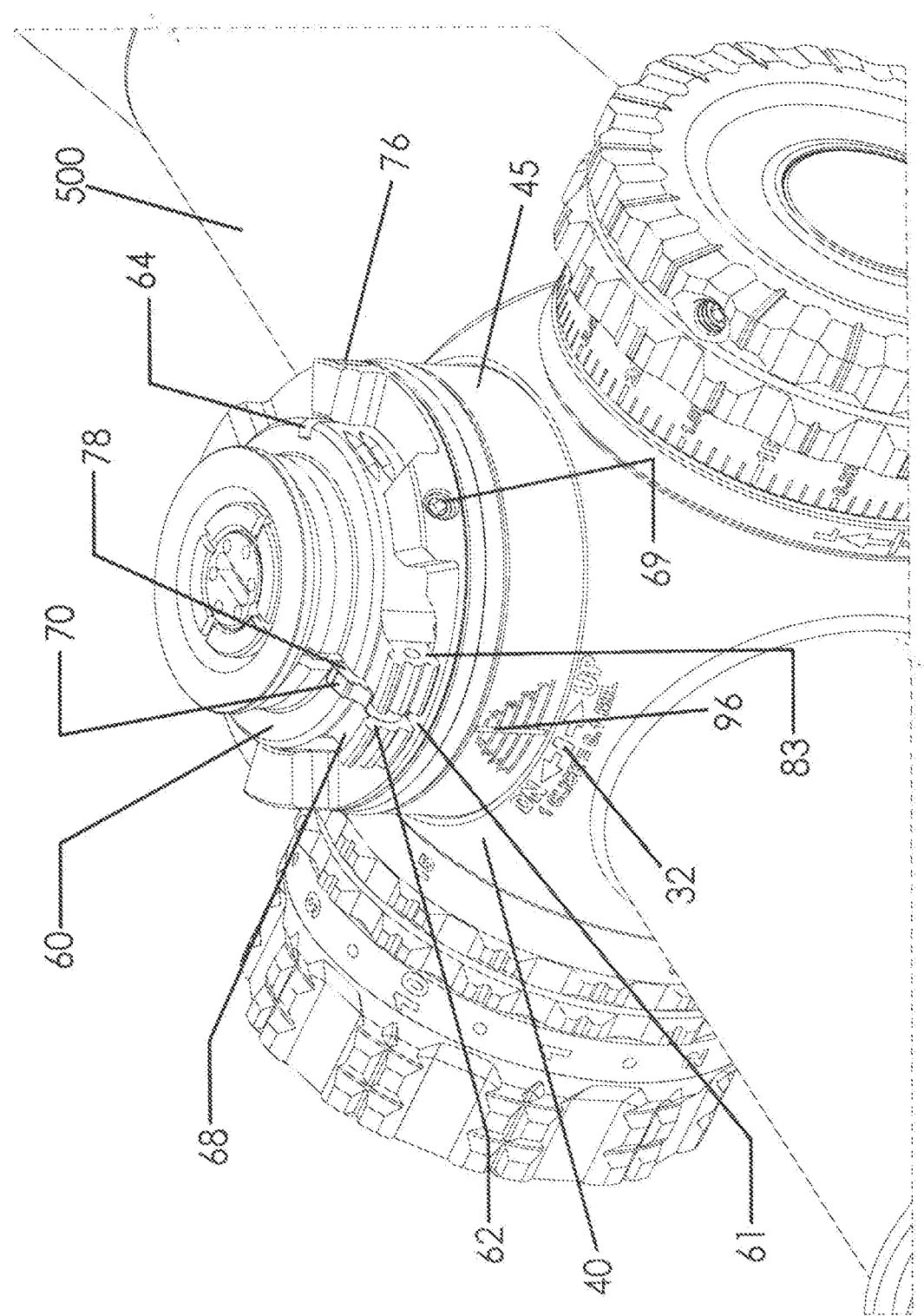
FIG. 3 is a perspective view of the locking adjustment assembly of FIG. 1 absent a turret cap.
Figure 4:
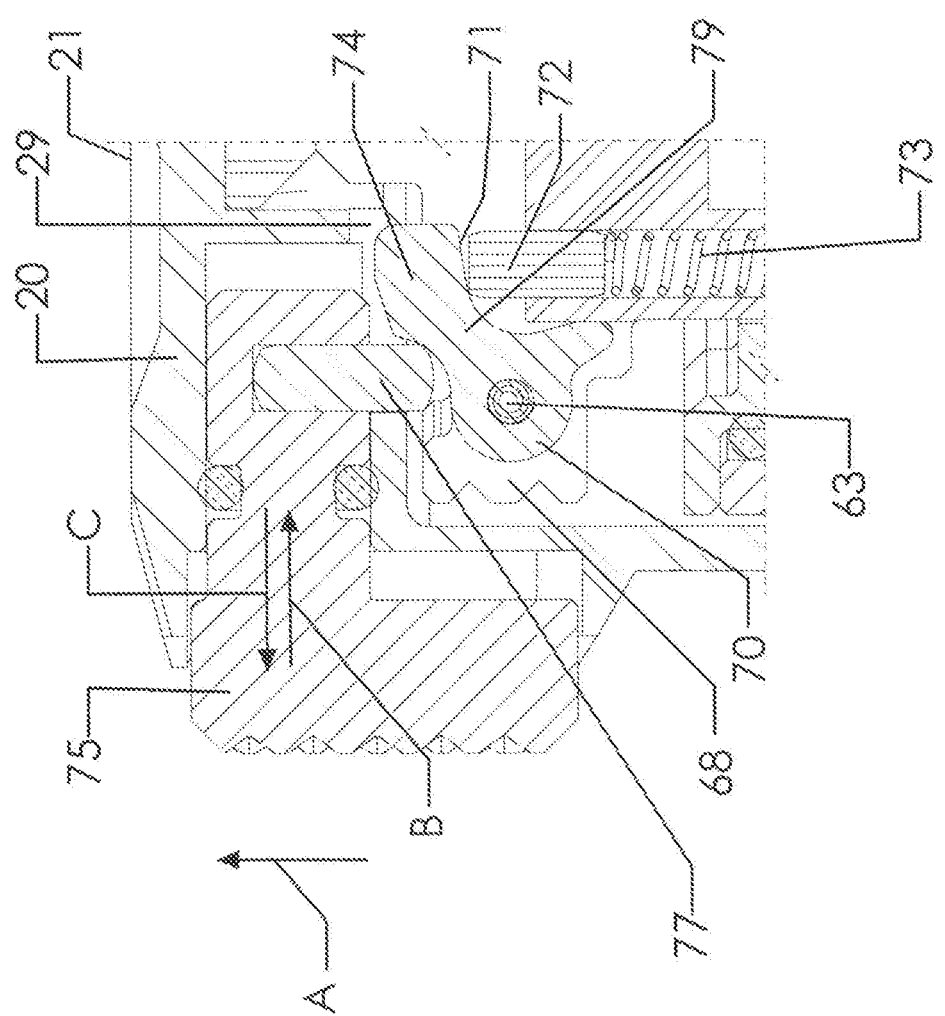
FIG. 4 is a side cross-sectional detailed view of a locking system of the locking adjustment assembly of FIG. 1 illustrating a locking lever in an engaged position with a turret cap assembly of the locking adjustment assembly.

With reference to FIG. 3, the locking lever carrier member 60 (or "carrier member 60") includes an outward protruding ledge section 68 divided into two equal parts defining a gap or slot 61 between opposing sidewalls 62, the slot 61 providing spacing for a locking lever member 70 (or "locking lever 70" or "locking cam 70") of the turret assembly 10, which is pivotally attached to one or both sidewalls 62 of the ledge section 68—see pivot member 63 defining a pivot point of the lever member 70 in FIG. 4. As shown, the locking lever 70 is radially disposed between the sidewalls 62 and includes an elongated portion including a neck section 79 and a head section 74 having a mating surface or face 71 for contacting a biased pin member 72 (or "locking lever plunger 72") housed within a cavity of the carrier member 60 in addition to a biasing member 73, e.g., a coiled spring. Suitably, the biasing member 73 is operationally configured to bias the locking lever plunger 72 linearly toward the locking lever 70 in a manner effective to direct the face 71 of the locking lever 70 toward a closed cover 21 portion of the turret cap 20 (see Directional Arrow A in FIG. 4). In one embodiment, the carrier member 60, the ledge section 68, the locking lever 70, the pin member 72 and the biasing member 73 may be referred to collectively as a "locking lever assembly."

The carrier member 60 includes an alignment slot 64 (see FIG. 3) running parallel to rotational axis 5 for receiving a distal end of a key pin 76 therein. The annular seat member 65 also includes one or more threaded boreholes for receiving set screws for securing the position of the carrier member 60 relative to a turret cap seat 23, which is part of a "second jacking screw assembly" also including the second jacking screw 35, the second jacking screw sleeve 37, the retaining ring 39 and the turret cap seat retaining ring 25.

Figure 5:
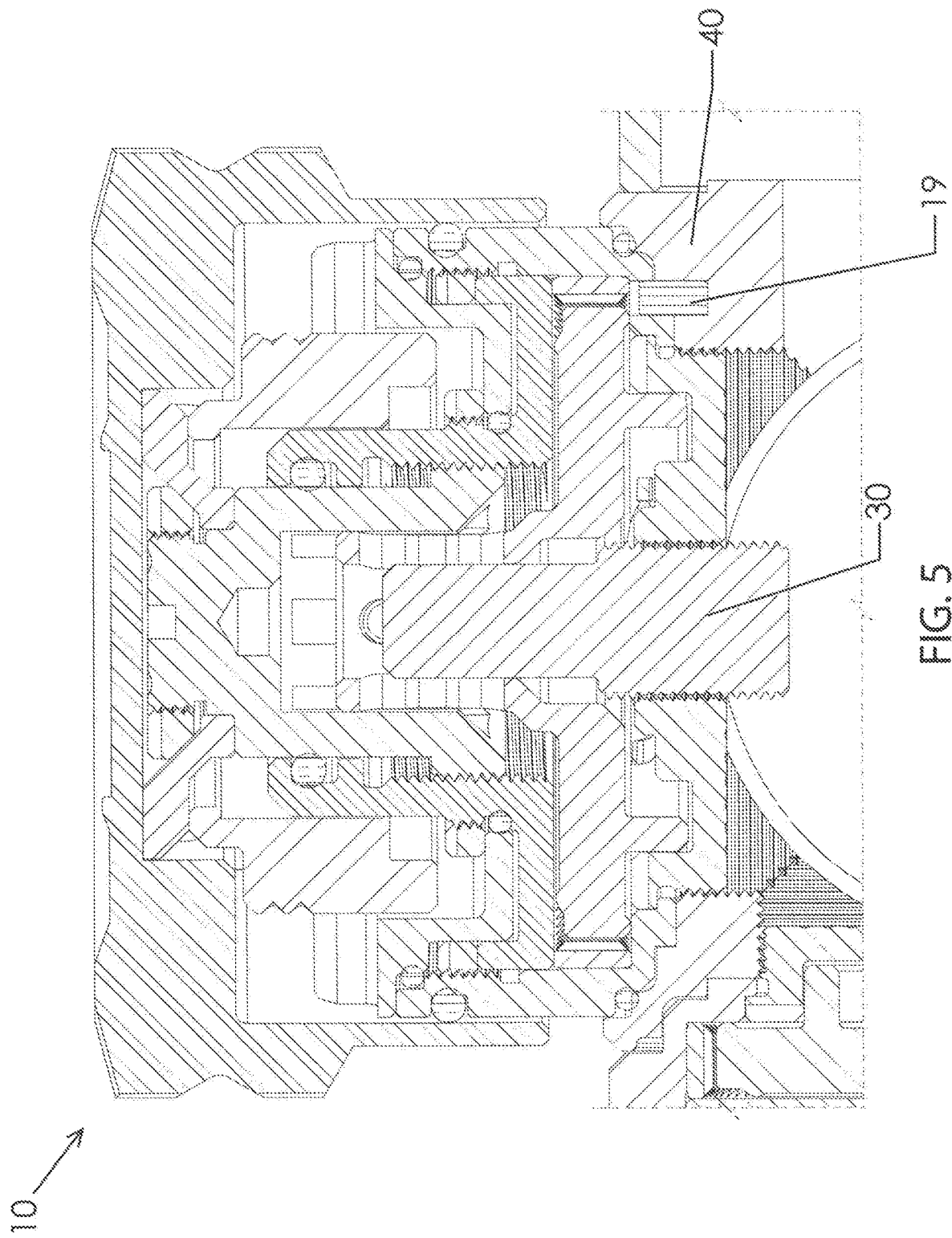
FIG. 5 is a side cross-sectional view of the locking adjustment assembly of FIG. 1.

Referring to FIGS. 2 and 5, the turret assembly 10 includes locating pins 15, 16, 17, 18 and 19. Suitably, locating pins 17, 18 and 19 are operationally configured to maintain the carrier member 60 in a desired position or "zero position" in relation to the main body 40. Locating pins 15 and 16 are positioned between part of the turret cap seat 23 and the second jacking screw 35 as a rigid interconnect for rotationally fixing the turret cap seat 23 to the turret cap seat retaining ring 25 whereby neither part turns independent of the other. Locating pins 17 and 18 are positioned between part of the second jacking screw sleeve 37 and the annular seat member 65 rigidly rotationally fixing the second jacking screw sleeve 37 to the annular seat member 65 so that neither part turns independent of the other.

The locating pins 17, 18 and 19 also mechanically align various rotatable component parts of the turret assembly 10 ensuring proper alignment of the parts during turret assembly 10 assemblage and operation. As shown in FIG. 3, the main seat member 45 may include a visual rotation and revolution indicator 96 for properly aligning the turret assembly 10, which can be used in conjunction with a rotation indicator 32 on the main body 40. As such, locating pin 19 locates for proper alignment of the main seat 45 to the main body 40 according to the center or a center line of the rotation indicator 32. Locating pin 17 locates for proper alignment of the second jacking screw 37 to the main seat 45 and locating pin 18 locates for proper alignment of the annular seat member 65 to the second jacking screw 37, the annular seat member 65 holding the key pin 76 therein. As such, proper alignment according to the locating pins 17, 18 and 19 provides for alignment of the locking lever 70 with the rotation and revolution indicator 96 and the rotation indicator 32 as shown in FIG. 3.

With particular attention to FIG. 2, the turret cap 20 may also be referred to as a "turret cap assembly" or "cap assembly" with a closed cover 21 and a cylindrical sidewall 22 extending out from the perimeter of the cover 21 enveloping or otherwise covering all or a majority of the components of the turret assembly 10 during operation. The sidewall 22 includes one or more threaded apertures 24 radially disposed there through for receiving threaded fasteners 27 (or "turret cap set screws 27") therein in a manner effective to fix the turret cap 20 to the turret cap seat 23 to promote rotation of the first and second jacking screws 30 and 35 when turning the turret cap 20.

Figure 6:
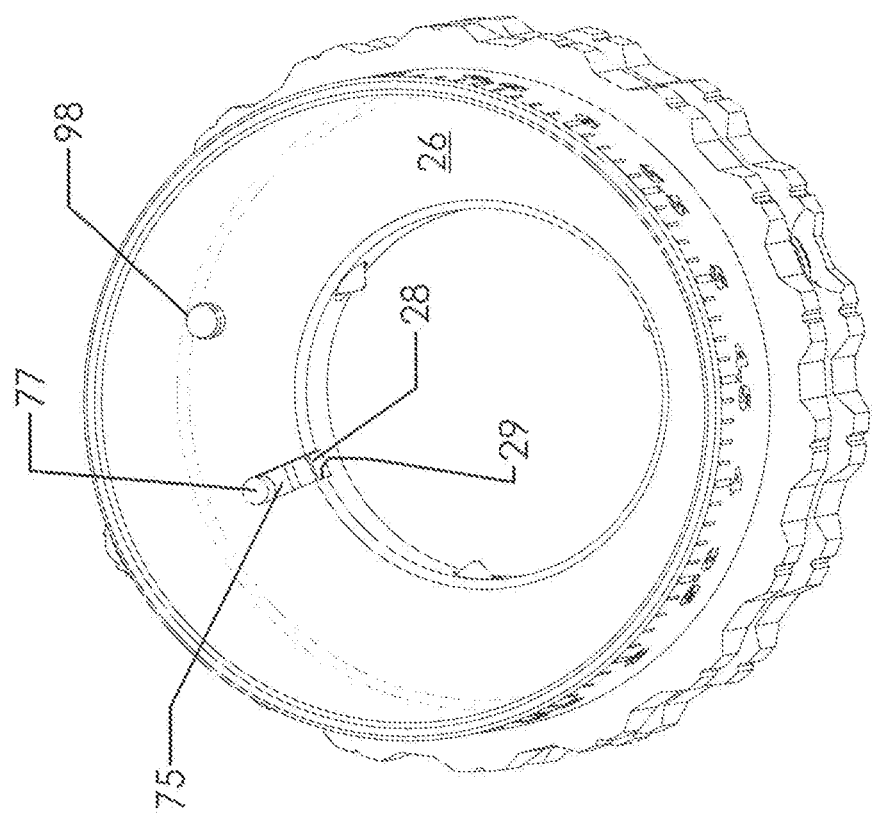
FIG. 6 is a perspective view of an inner surface of a turret cap assembly of the locking adjustment assembly of FIG. 1.

Referring to FIG. 6, the inner surface 26 of the cover 21 of the turret cap 20 includes a radially disposed slot 28 defined by opposing sidewalls 29 including, but not necessarily limited to planar sidewalls for receiving a radially disposed unlocking button 75 (or "push button 75") therein. As shown, the unlocking button 75 includes a radially disposed protuberance (hereafter "unlocking button pin 77" or "turret unlock button pin 77" or "button pin 77") received with the slot 28. In one embodiment, the unlocking button 75 and button pin 77 may be provided as a one-piece member. In another embodiment, the unlocking button 75 and button pin 77 may be provided as an assembly. As depicted in FIG. 4, the unlocking button 75 and button pin 77 may be directed radially inward and outward along slot 28 according to Directional Arrows B and C, which are directionally perpendicular to rotational axis 5. In this embodiment, a first part of the unlocking button 75 is located external the sidewall 22 of the turret cap 20 providing a contact surface for a user of the turret assembly 10, e.g., a surface to be contacted by a person's fingers and/or a hand held tool, whereby a user can apply an inward force to the unlocking button 75 to direct the unlocking button 75 radially inward (see Directional Arrow B). In one embodiment, the unlocking button 75 and button pin 77 may be considered as part of the cap assembly.

Figure 7:
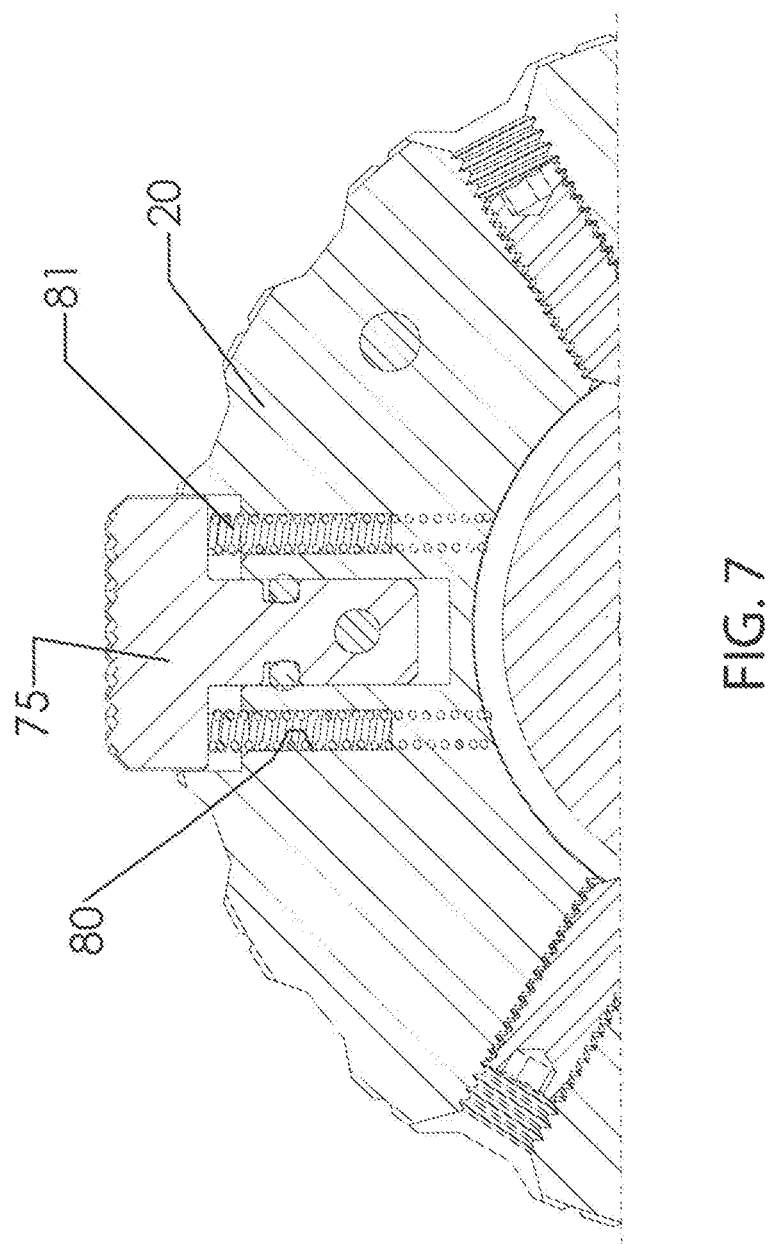
FIG. 7 is a sectional detailed view of part of the turret cap assembly of FIG. 6.
Figure 8:
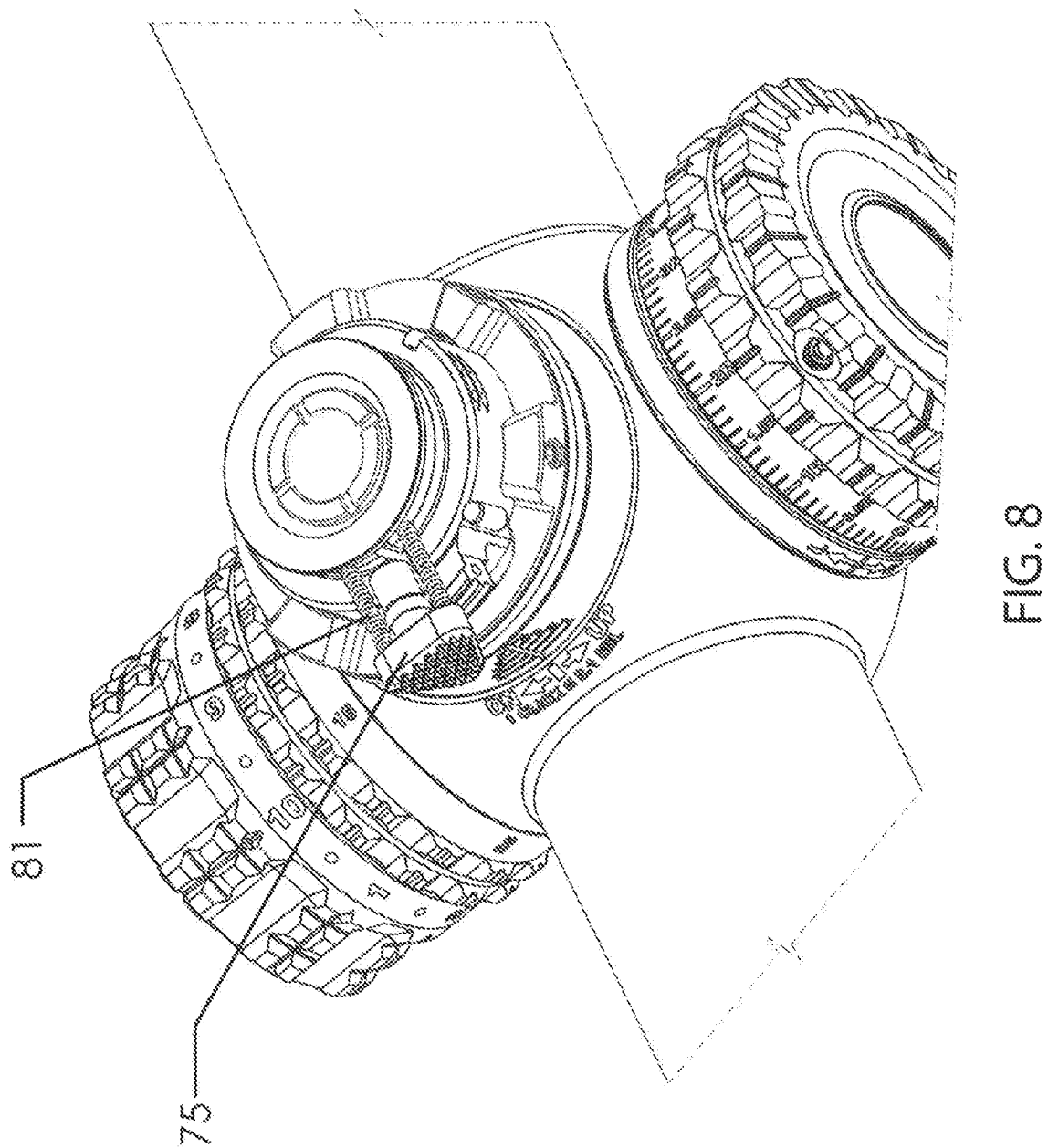
FIG. 8 is a perspective view of the locking adjustment assembly of FIG. 1 absent a turret cap.

Turning to FIGS. 7 and 8, in one suitable embodiment the cover 21 of the turret cap 20 may include one or more cavities 80 housing one or more biasing members 81 therein operationally configured to bias the unlocking button 75 and button pin 77 outward according to Directional Arrow C as shown in FIG. 4. In other words, the unlocking button 75 may be considered as being "spring loaded" as such term is understood by the skilled artisan. Accordingly, an inward force applied to the unlocking button 75 must be greater than the biasing force of the one or more biasing members 81 in order to move the unlocking button 75 and button pin 77 inward according to Directional Arrow B.

Herein, the locking lever 70, the locking lever plunger 72, the biasing member 73, the unlocking button 75, the button pin 77, the slot 28 and its opposing sidewalls 29 and the inner surface 26 of the cover 21 of the turret cap 20 may collectively be referred to as a "locking system" of the turret assembly 10. With reference to FIGS. 4 and 6, at a first position (or "locked position") of the turret assembly 10, the unlocking button 75 and button pin 77 are biased outward to a first position or "resting position" of the unlocking button 75 and button pin 77. In this embodiment, the shape of the locking lever 70, e.g., the narrowed neck section 79, provides clearance for a distal end of the button pin 77 as shown allowing the head section 74 of the locking lever 70 to be biased or urged by the locking lever plunger 72 toward the inner surface 26 of the cover 21 of the turret cap 20 (see Directional Arrow A) whereby the head section 74 or at least part of the head section 74 is positioned within the slot 28 between opposing sidewalls 29. The position of the head section 74 within the slot 28 prevents rotation of the turret cap 20 about rotational axis 5 as the head section 74 acts as a surface stop against the sidewalls 29 of slot 28. In particular, the opposing sidewalls 78 of the locking lever 70 include one or more engagement surfaces for contacting one or more engagement surfaces of the sidewalls 29 of the slot 28. In one embodiment, the opposing sidewalls 78 of the locking lever 70 may include planar engagement surfaces for engaging planar sidewalls 29 of the slot 28. The shape of the head section 74 including opposing sidewalls suitably provides an increased surface area as an engagement surface for contacting the sidewalls of slot 28 and preventing manual turning of the turret cap 20.

Figure 9:
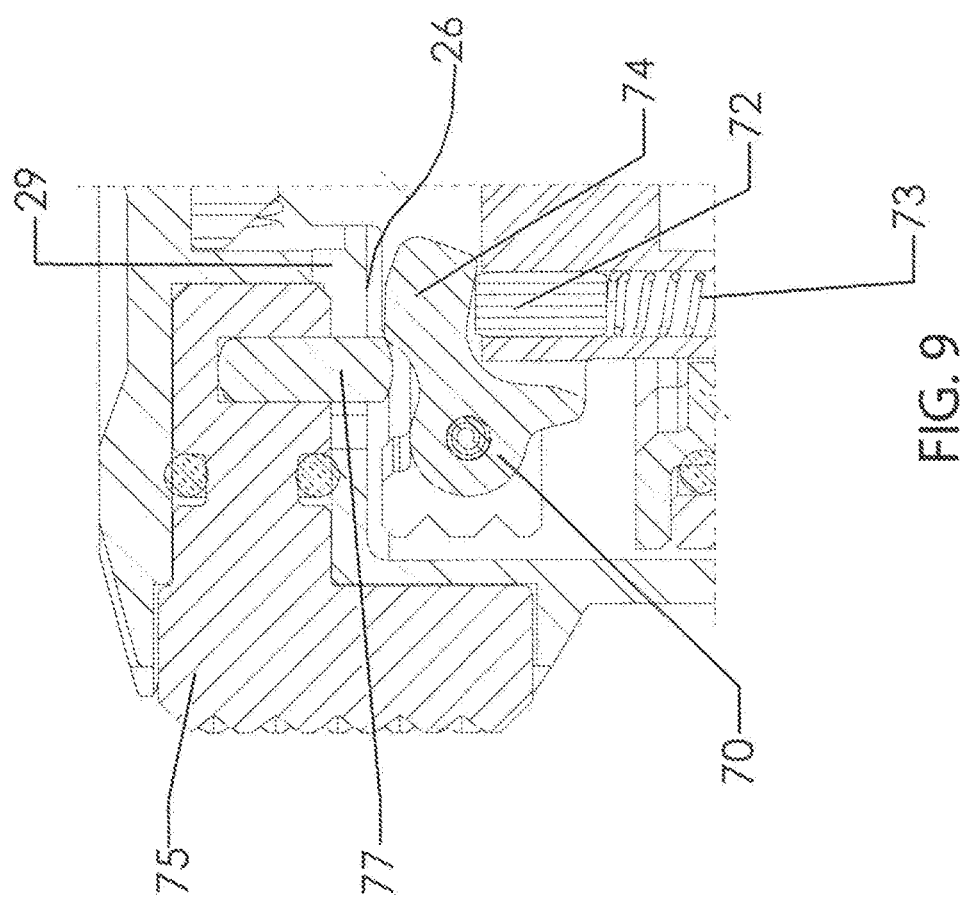
FIG. 9 is a side sectional detailed view of the locking system of FIG. 4 illustrating the locking lever disengaged from the turret cap assembly.

At a second position (or "unlocked position") of the turret assembly 10 as depicted in FIG. 9, the unlocking button 75 and button pin 77 are directed inward (see Directional Arrow B) wherein the button pin 77 acts on the locking lever 70, which simultaneously acts on the locking lever plunger 72. In particular, inward travel of the button pin 77 pivots the head section 74 out from between sidewalls 29 of slot 28 away from the inner surface 26 of the cover 21 of the turret cap 20, which in turn directs the locking lever plunger 72 in a direction opposite of Directional Arrow A providing clearance between the head section 74 and the inner surface 26 of the cover 21. When the turret cap 20 is turned, the button pin 77 disengages the locking lever 70 and the head section 74 of the locking lever 70 is biased toward the inner surface 26 of the cover 21 via the locking lever plunger 72 and biasing member 73.

Figure 10:
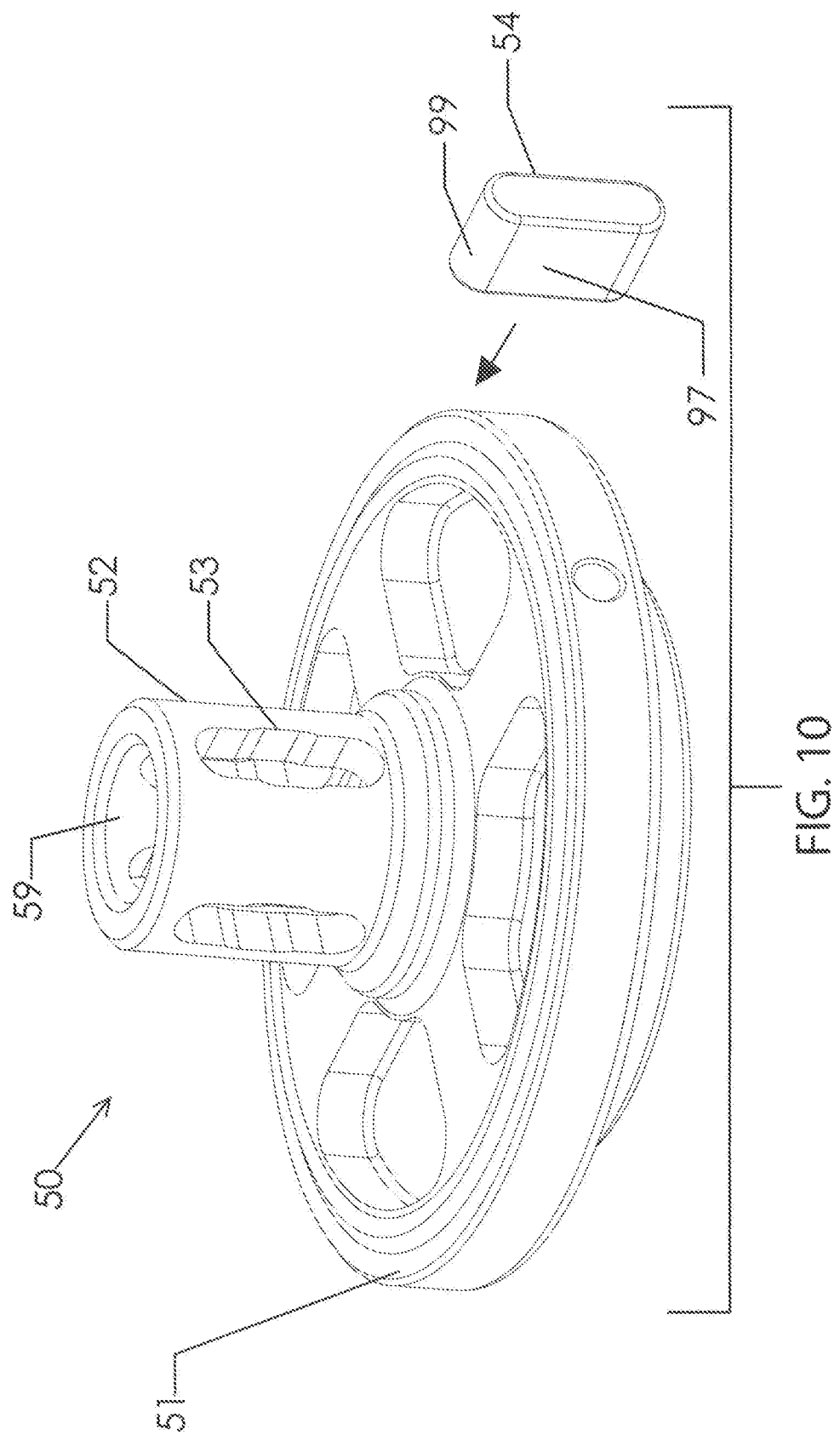
FIG. 10 is a perspective exploded view of a main shaft and a key member of the locking adjustment assembly of FIG. 1.

The turret assembly 10 further includes an annular main shaft member 50 (or "main shaft 50") fixedly engaged with the main seat 45 and main seat retaining ring 47. As seen in FIG. 10, the main shaft 50 has a circular disc type section 51 and a raised cylindrical section 52. As discussed below, the main shaft 50 includes an opening along rotational axis 5 defined by an inner surface 59 for receiving the first jacking screw 30 in a mated position therein and the cylindrical section 52 includes an outer surface 58 mated with an inner surface 36 of the second jacking screw 35. The first jacking screw 30 and second jacking screw 35 are coupled (or keyed) together via one or more key members 54 inserted through the cylindrical section 52 providing a key joint assembly. As such, the first jacking screw 30 and second jacking screw 35 have a one-to-one rotational relationship.

Figure 11:
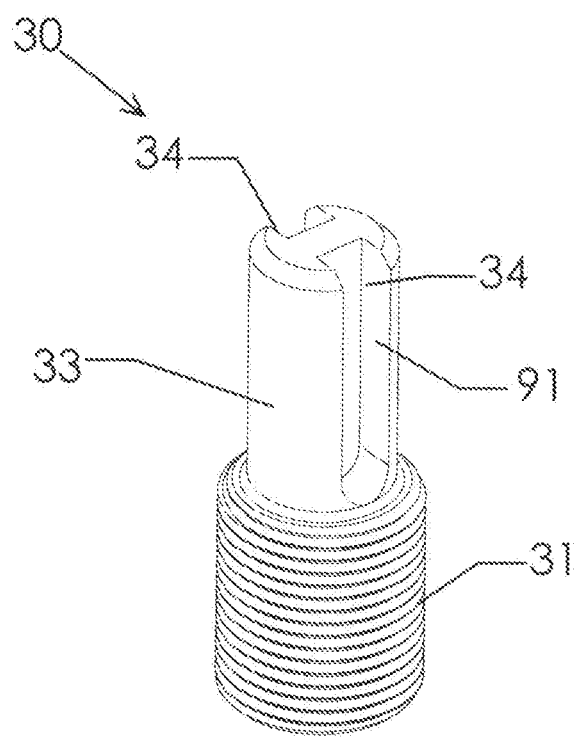
FIG. 11 is a perspective view of a first jacking screw of the locking adjustment assembly of FIG. 1.
Figure 12:
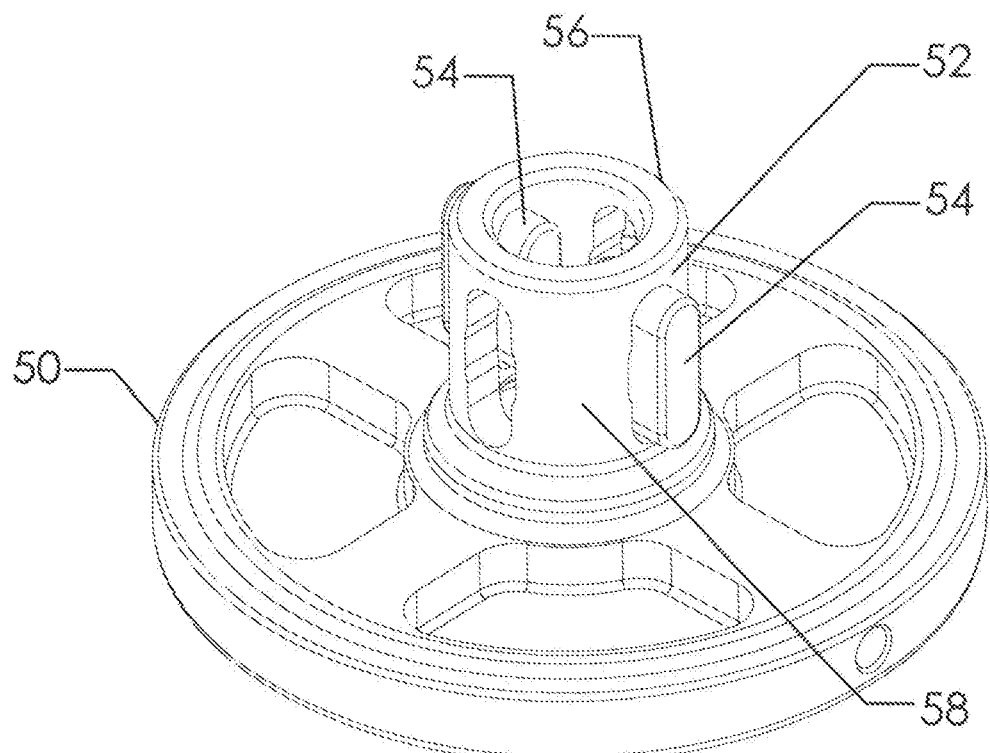
FIG. 12 is a perspective view of the main shaft and key member of FIG. 10 in a mated position.

In detail, the cylindrical section 52 includes one or more apertures 53 or keyseats 53, each keyseat 53 receiving a corresponding key member 54 there through (see FIGS. 10 and 12) in a manner effective to couple the first jacking screw 30 with the second jacking screw 35. As shown in FIG. 11, one suitable first jacking screw 30 includes a non-threaded section 33 with two opposing slots 34 (hereafter "keyways 34") disposed lengthwise along the non-threaded section 33 for receiving a key member 54 therein. In particular, when the first jacking screw 30 is set to a mated position within the main shaft 50, the keyways 34 are aligned with two opposing keyseats 53 enabling key members 54 to be press fit through the keyseats 53 into the keyways 34 for rotatably fixing the first jacking screw 30 to the main shaft 50. As shown in FIG. 12, each key member 54 is set in a keyseat 53 with an inner portion of the key members 54 extending inward to engage the keyways 34 and an outer portion of the key members 54 extending outward from the outer surface 58 of the cylindrical section 52 for mating with the second jacking screw 35.

Figure 13:
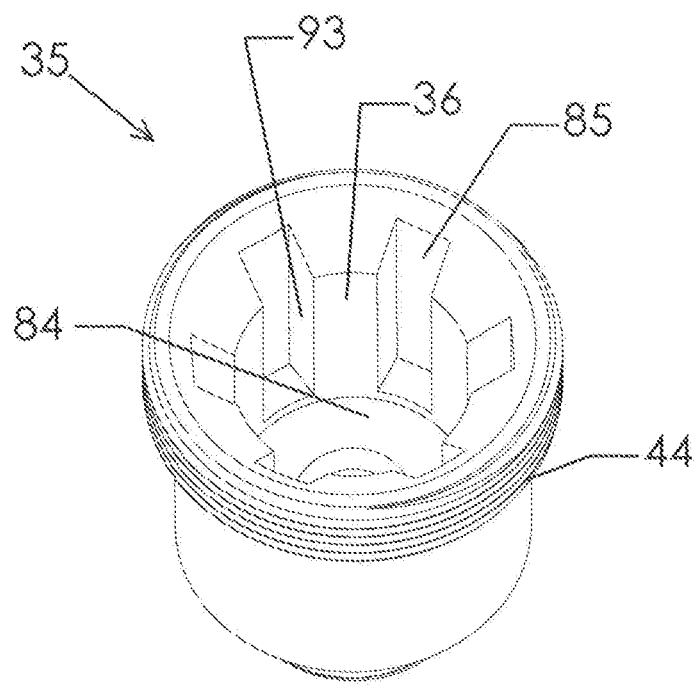
FIG. 13 is a bottom perspective view of a second jacking screw of the locking adjustment assembly of FIG. 1.

Turning to FIG. 13, the second jacking screw 35 includes an opening along rotational axis 5 defined by an inner surface 36 for receiving the cylindrical section 52 of the main shaft 50 therein. As shown, the inner surface 36 includes an annular abutment surface 84 for a distal end 56 of the cylindrical section 52. The inner surface 36 further includes key slots 85 for receiving the outer portion of the key members 54 therein. The second jacking screw 35 of this embodiment has a total of six key slots 85 disposed equally apart about the inner surface 36. However, in another embodiment the second jacking screw 35 may include a minimum number of key slots 85 effective for mating with a particular total number of key members 54 included as part of the turret assembly 10. Suitably, the inner diameter of the inner surface 36 of the second jacking screw 35 is substantially similar as the outer diameter of the outer surface 58 of the cylindrical section 52 of the main shaft 50 and the outer diameter of the non-threaded section 33 of the first jacking screw 30 is substantially similar as the inner diameter of the inner surface 59 of the cylindrical section 52 providing a machine fit there between. With reference to FIG. 10, in one embodiment each key member 54 may include a perimeter mating surface for mating with corresponding keyseats 53, keyways 34 and key slots 85, the perimeter mating surface including opposing planar engagement surfaces 97 and opposing curved engagement surfaces 99—see planar surface 91 in FIG. 11 and planar surface 93 in FIG. 13. In another embodiment, the size and shape of the key members 54, keyseats 53 and keyways 34 may vary.

Figure 14:
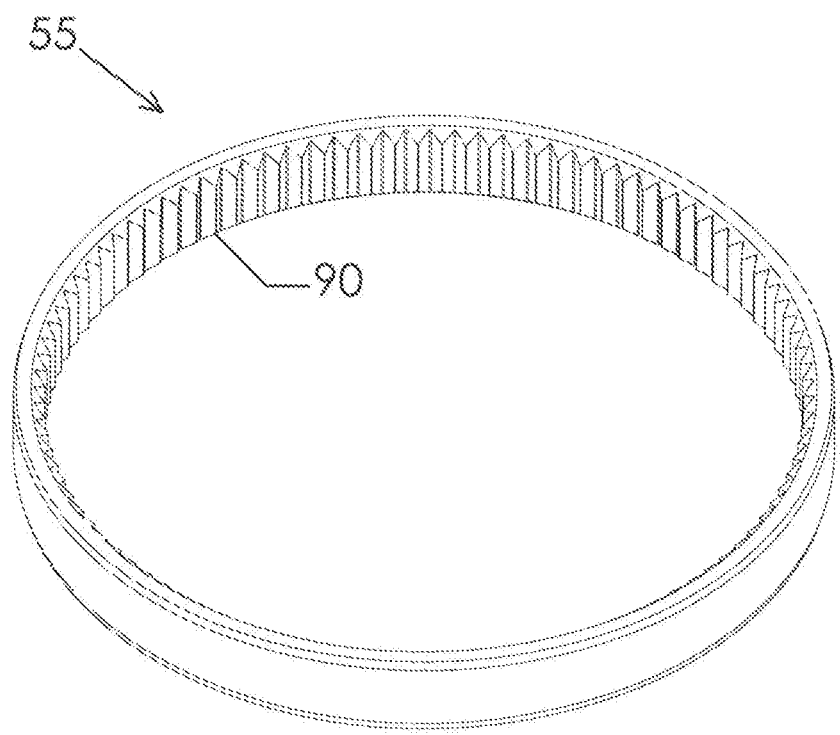
FIG. 14 is a perspective view of a click ring of the locking adjustment assembly of FIG. 1.
Figure 15:
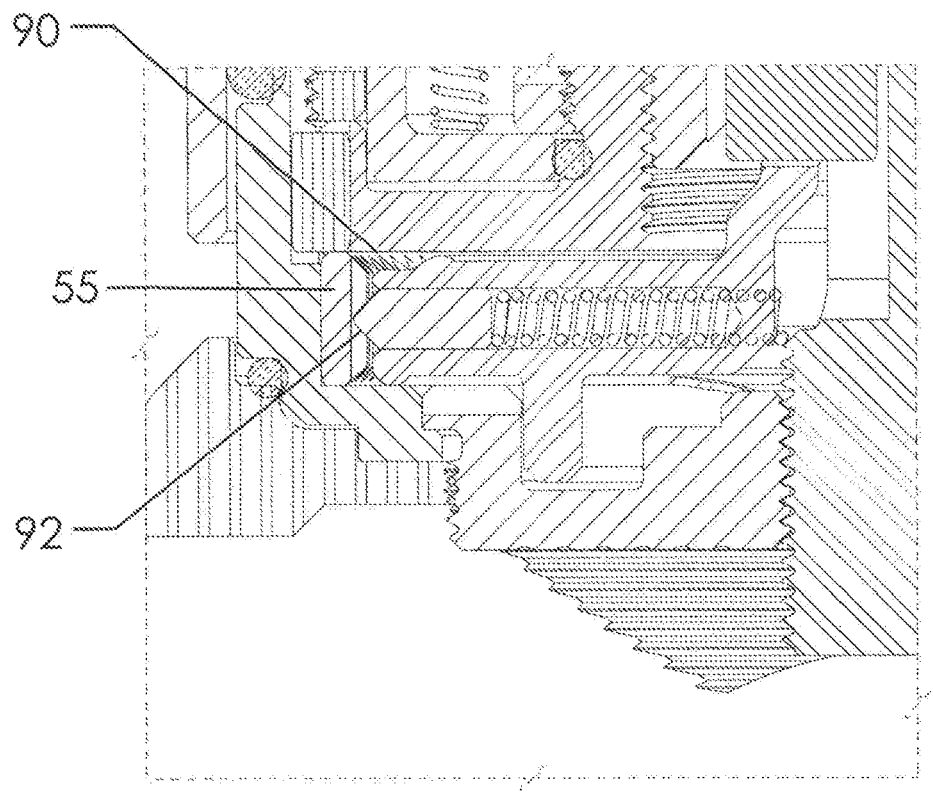
FIG. 15 is a cross-sectional detailed view of a click ring and click pin of the locking adjustment assembly of FIG. 1.
Figure 16:
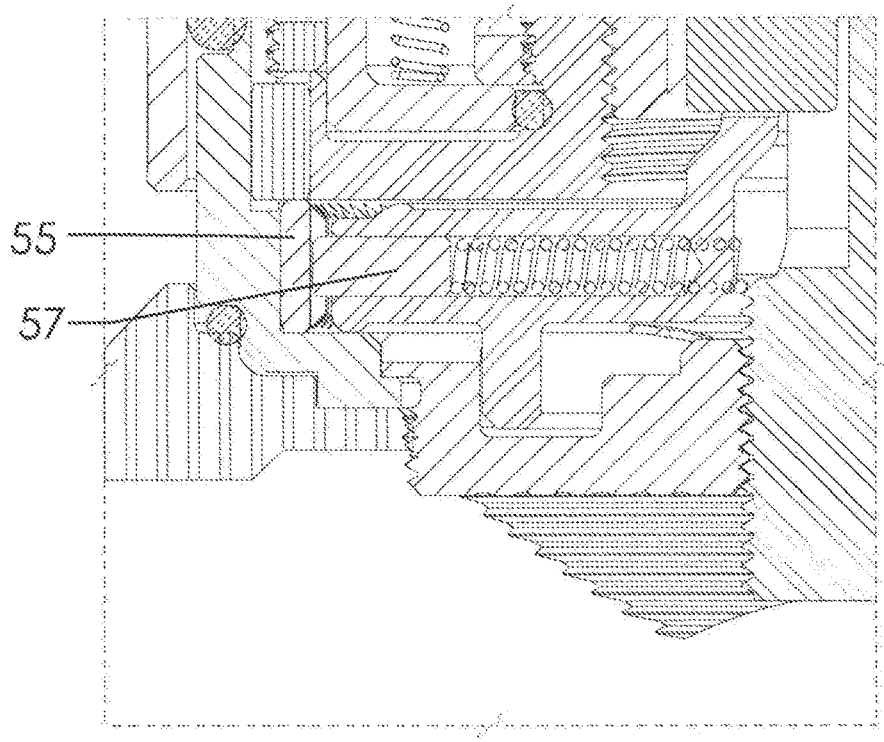
FIG. 16 is a cross-sectional detailed view of another embodiment of the click ring and click pin of the locking adjustment assembly of FIG. 1.

Referring again to FIG. 2, the turret assembly 10 further includes a click ring 55 press fit, glued or threaded into the main seat 45. A corresponding plunger or "click pin 57" is located in a radial borehole 87 of the disc type section 51 of the main shaft 50 along with one or more biasing members 88 operationally configured to bias the click pin 57 radially outward to an abutment position with the click ring 55. The inner surface of the click ring 55 suitably includes a plurality of ridges and grooves 90 (see FIG. 14) and the distal end 92 of the click pin 57 may include a tapered surface, e.g., wedge shaped, promoting linear movement of the click pin 57 back and forth as the distal end 92 rides over the ridges and grooves 90 of the click ring 55. The click ring 55 and click pin 57 together provide audible and tactile clicks as the turret assembly 10 is turned. At a resting position, the distal end 92 is biased between adjacent ridges in a particular groove (see FIGS. 15-16). Without limiting the disclosure to a particular number of clicks per rotation, in one suitable embodiment the click ring 55 includes a number of ridges and grooves 90 providing one hundred clicks per rotation of the turret assembly 10 360.0 degrees.

Another feature of the turret assembly 10 includes variation in thread pitch between the first jacking screw 30 defined by a first thread pitch and the second jacking screw 35 defined by a second thread pitch. In other words, the first jacking screw 30 moves linearly in either direction along rotational axis 5 when rotated (hereafter referred to as an "up-and-down" direction) at a different rate than the second jacking screw 35. In one embodiment, metric thread sizes may be employed, i.e., the distance between crests of adjacent threads. In another embodiment, inch thread sizes may be employed, i.e., the number of threads per inch.

The thread pitch of the first jacking screw 30 is determined by the focal length of the corresponding optical platform, i.e., the click value and clicks per rotation. The thread pitch of the second jacking screw 35 is a set value. The second jacking screw 35 may vary in overall size, but the thread pitch of the second jacking screw 35 is a constant set value. For purposes of discussion, the disclosure will be discussed in terms of a second jacking screw 35 with a thread pitch of 1.0 mm. As a result, the second jacking screw 35, as well as the whole turn assembly 10, raises and lowers 1.0 mm per rotation of the turret cap 20. Because the thread pitch of the second jacking screw 35 is a set value, the turret assembly 10 may be used across different optical platforms regardless of the thread pitch of the first jacking screw 30. Herein, such feature may be referred to as "thread pitch dissimilarity" of the adjustable assembly.

Figure 17:
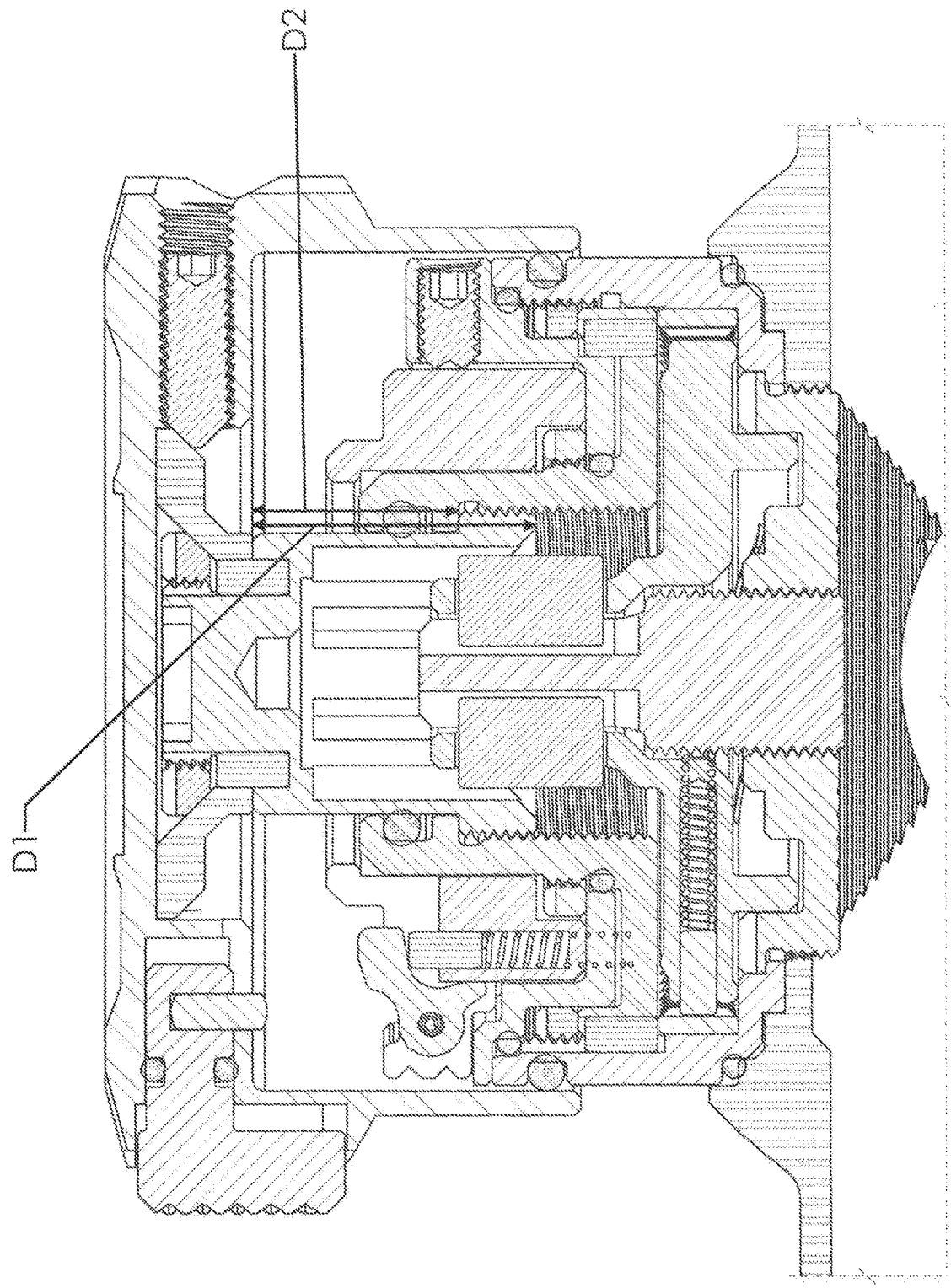
FIG. 17 is a side cross-sectional view of the locking adjustment assembly of FIG. 1 set at its highest position.

As shown in FIG. 17, overall travel of the turret assembly 10 is limited by two dimensions D1 and D2, which may vary from one optical platform to the next. Suitably, travel of the first jacking screw 30 and the second jacking screw 35 end at the same moment during operation. For example, in an embodiment where the first jacking screw 30 has a thread pitch of 2.0 mm, the second jacking screw 35 has a thread pitch of 1.0 mm and the overall travel of the turret assembly 10 is 5.0 mm, the first jacking screw 30 can rotate 2.5 rotations, meaning that the overall travel of the second jacking screw 35 is limited to 2.5 mm up-and-down.

Figure 18:
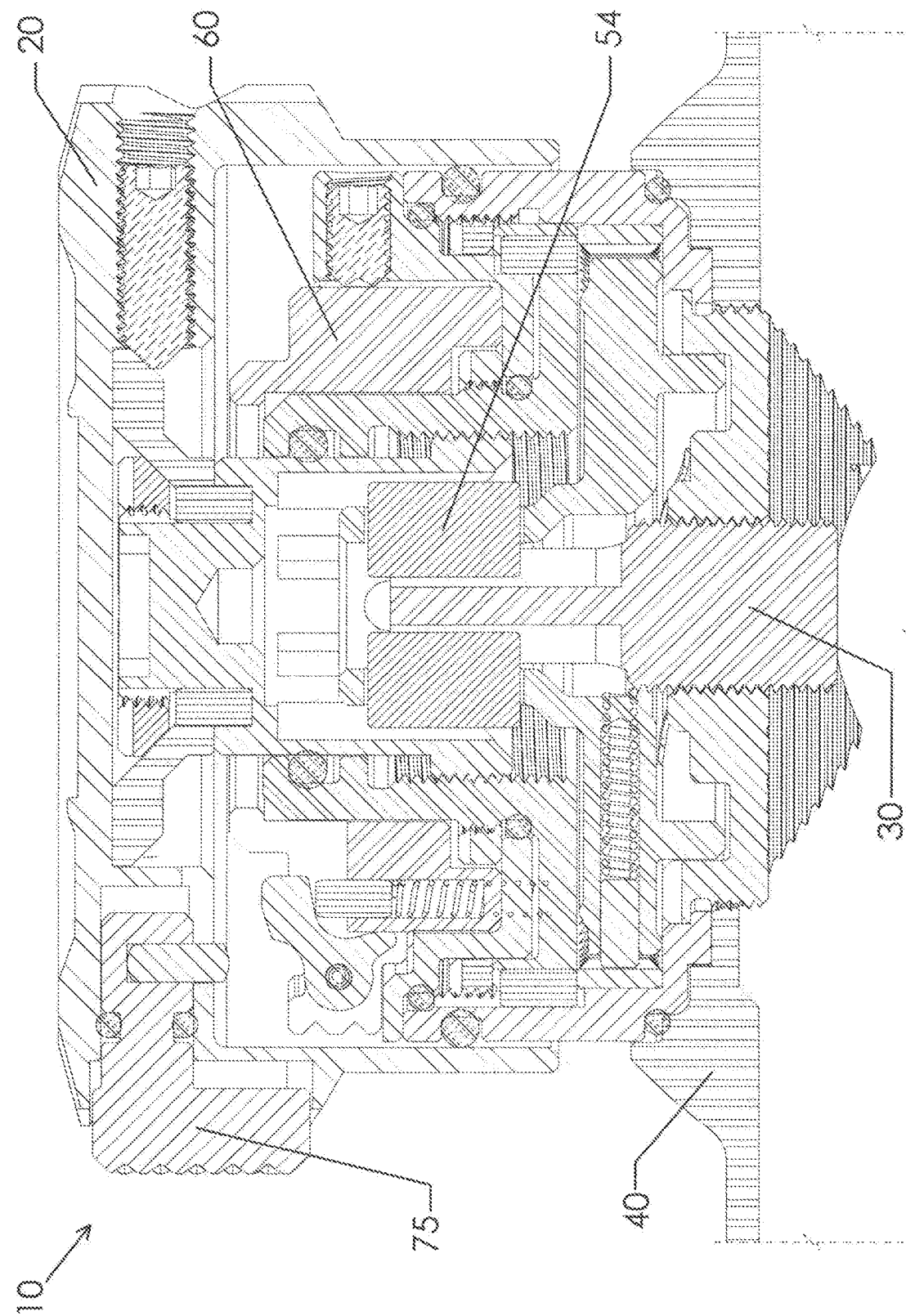
FIG. 18 is a side cross-sectional view of the locking adjustment assembly of FIG. 1 at its middle position.
Figure 19:
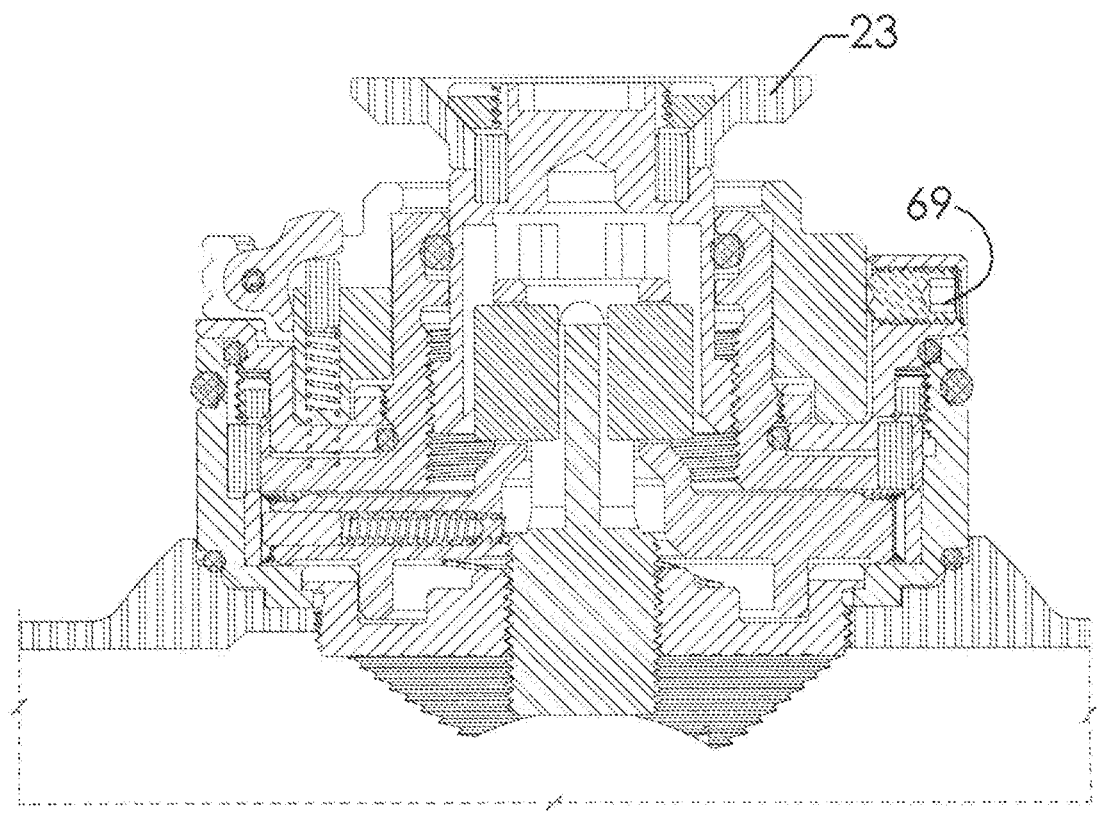
FIG. 19 is a side cross-sectional view of the locking adjustment assembly of FIG. 18 absent a turret cap.
Figure 20:
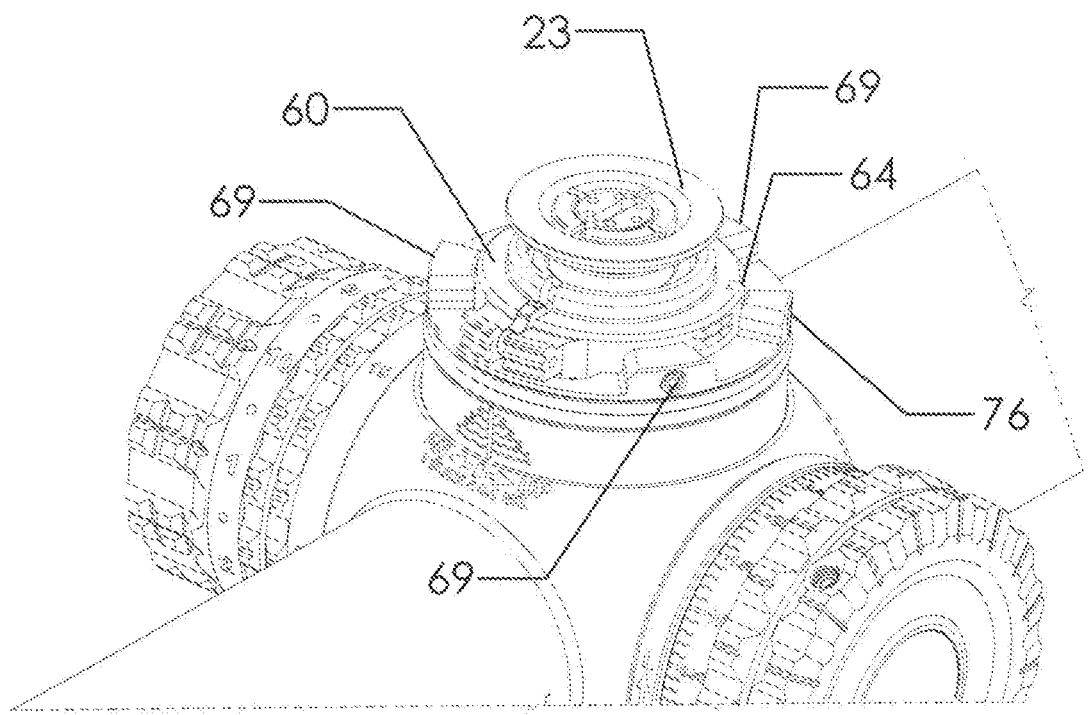
FIG. 20 is a perspective view of the locking adjustment assembly of FIG. 19.
Figure 21:
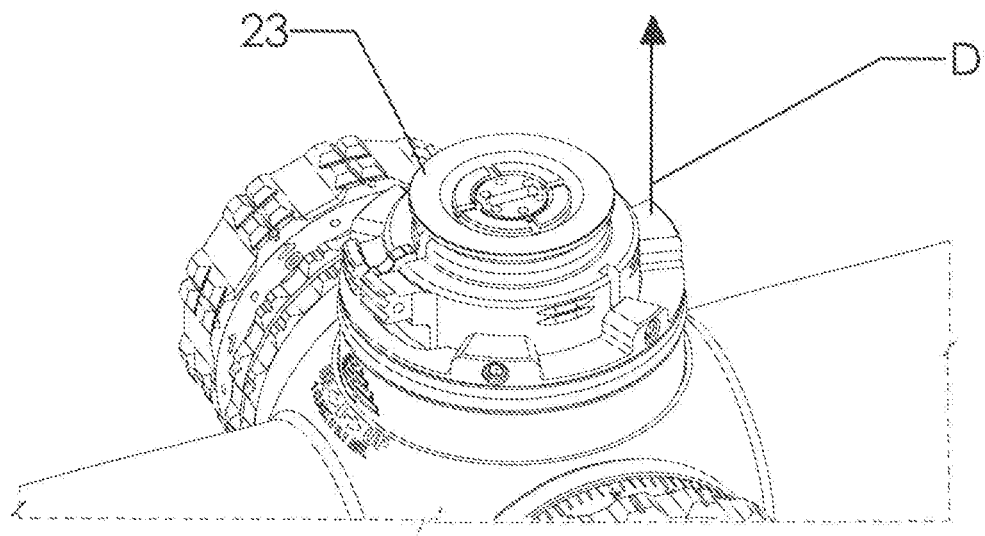
FIG. 21 is a perspective view of the locking adjustment assembly of FIG. 19.
Figure 22:
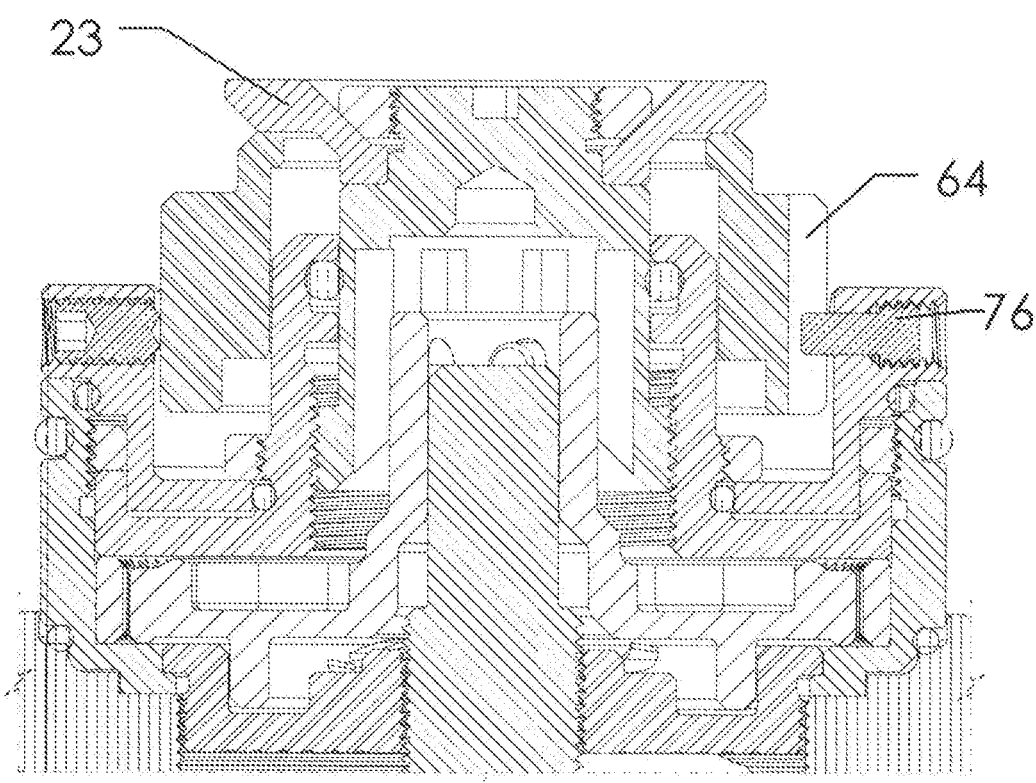
FIG. 22 is a perspective sectional view of the locking adjustment assembly of FIG. 19.

Another novel feature of the turret assembly 10 involves the manner in which the turret assembly 10 is reset to optical zero according to the turret cap 20 (also referred to herein as "re-zeroing" of the turret assembly 10). With attention to FIG. 18, the turret assembly 10 is suitably set at a middle travel position of the first jacking screw 30 and second jacking screw 35, i.e., optical zero of the turret assembly 10. As shown, at a middle travel position of the first jacking screw 30 and second jacking screw 35 the carrier member 60 is set at its lowest position relative the main body 40. In one embodiment of re-zeroing, the unlocking button 75 and button pin 77 may be radially aligned with the locking lever 70. However, re-zeroing may be accomplished with the unlocking button 75 and button pin 77 being located at any position along its 360.0 degree rotation.

With the turret cap 20 set at a desired position in its 360.0 degree rotation, the turret cap set screws 27 can be loosened in order to remove the turret cap 20 from the remaining turret assembly 10. Referring to FIGS. 19-22, once the turret cap 20 is removed the threaded set screws 69 for securing the position of the locking lever assembly can be loosened allowing the carrier member 60 to be directed toward an abutment position with the turret cap seat 23 (see Directional Arrow D). Based on the orientation of slot 64 and the mating position of the key pin 76 between opposing sidewalls defining the slot 64, the carrier member 60 is limited to linear movement up-and-down (see Directional Arrow E). As stated above, the locating pins 17, 18, 19 are cooperatively operationally configured to maintain the carrier member 60 in a zero position in relation to the main body 40. As such, once the carrier member 60 is set at an abutment position with the turret cap seat 23, the turret cap 20 may be reinstalled to an operating position by setting the locking lever 70 at a locked position within slot 28 thereby setting the zero (0) mark 95 of the rotational position markings on the turret cap 20 according to the rotation and revolution indicator 96 on the main seat member 45 and the rotation indicator 32 on the main body 40—see the location of the unlocking button 75 directly above and in-line with the zero (0) mark 95 in FIG. 23. As understood by the skilled artisan, the zero (0) mark suitably corresponds to a specific point of aim configuration of a riflescope 500.

Figure 23:
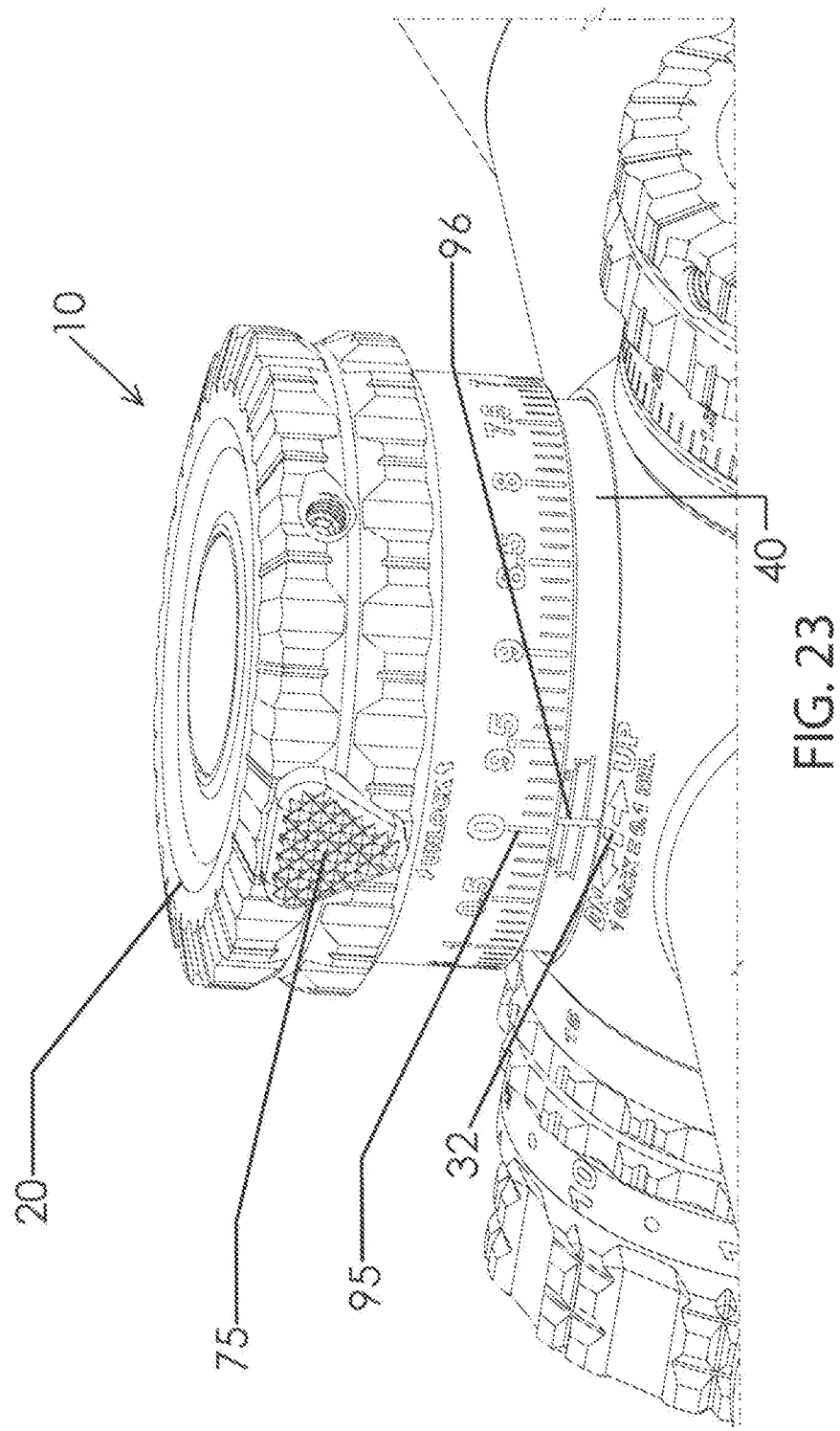
FIG. 23 is a perspective view of the locking adjustment assembly of FIG. 1 illustrating a zero position of the locking adjustment assembly.

Once the turret cap 20 is set as shown in FIG. 23, the turret cap set screws 27 may be tightened to secure the turret cap 20 to the turret cap seat 23 readying the turret assembly 10 for operation. To unlock the turret assembly 10, a user can apply an inward force to the unlocking button 75 (see Directional Arrow B) directing the locking lever 70 to a clearance position out of the slot 28 of turret cap 20 as discussed in reference to FIG. 9 above. As the turret cap 20 begins to turn, the slot 28 is no longer aligned with the locking lever 70 whereby the locking lever 70 may be biased against the inner surface 26 of the cover 21 of the turret cap 20, i.e., the locking lever 70 rides against the inner surface 26, until redirected to its locked position within slot 28. Suitably, the locking lever 70 engages the slot 28 by less than the thread pitch of the second jacking screw 35, meaning that the locking lever 70 only engages the slot 28 at the correct zero position—not at any other upward rotation of the turret cap 20.

Figure 24:
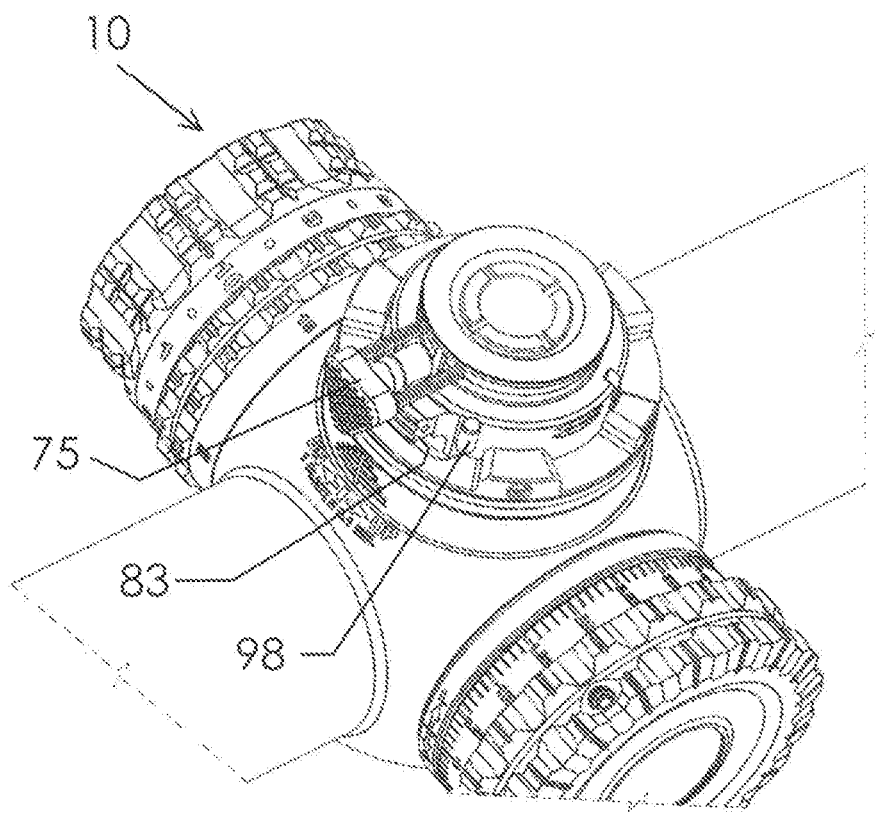
FIG. 24 is a perspective partial view of the locking adjustment assembly of FIG. 1 including a secondary stop of a turret cap assembly.
Figure 25:
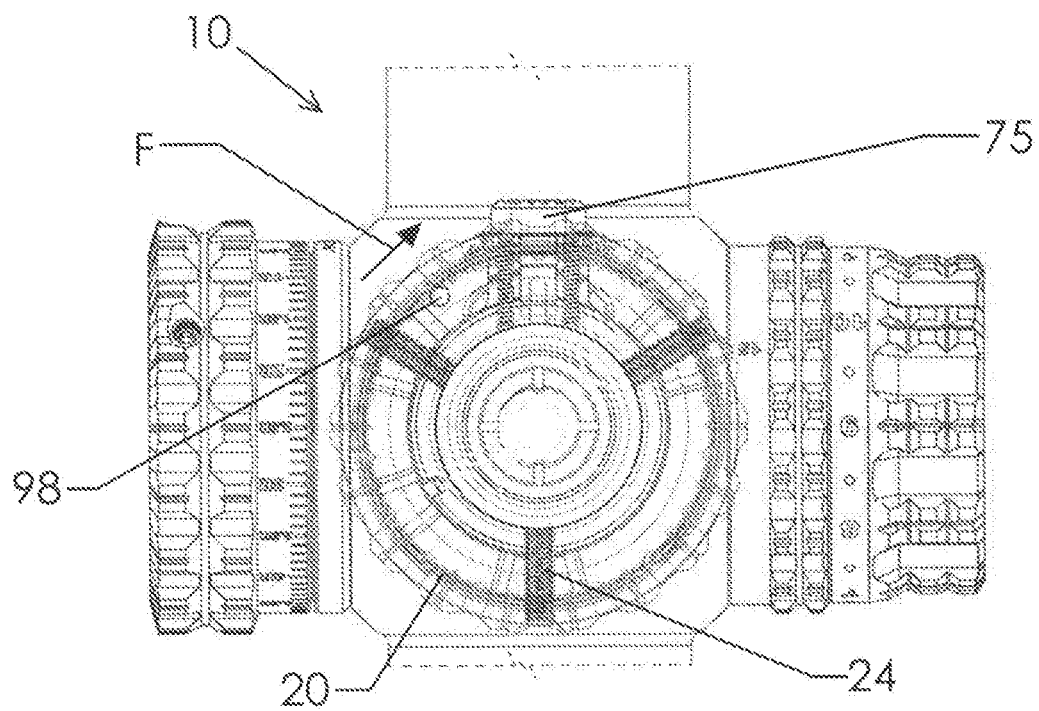
FIG. 25 is a top partial phantom view of the locking adjustment assembly of FIG. 1.

Referring to FIGS. 6, 24 and 25, the inner surface 26 of the cover 21 of the turret cap 20 may also include a secondary stop 98 extending out from the inner surface 26 a distance effective to engage a stop type surface of the locking lever assembly. For example, a user may want to dial the turret assembly 10 clockwise a few clicks past the zero (0) mark 95, e.g., in case of an unexpected point of impact shift. Whereas known turret knobs are susceptible to binding, i.e., tightening of its threaded connections when being turned clockwise past zero (0), the secondary stop 98 of the present turret assembly 10 is advantageous in that it acts as a safety feature in the event a user turns the turret cap 20 clockwise past zero (0). In particular, the secondary stop 98 is operationally configured to engage a sidewall 83 of the ledge section 68 of the carrier member 60 (see FIG. 3) providing a hard stop for the turret assembly 10. The location of the secondary stop 98 along the inner surface 26 may vary as desired. In the embodiment as shown in FIG. 25, the location of the secondary stop 98 is operationally configured to allow travel clockwise past zero (0) a total of four (4) clicks (see Directional Arrow F).

A turret assembly 10 of this disclosure may be constructed from one or more materials durable for one or more operations and/or as may be required by law or regulation. Suitable materials of construction may include, but are not necessarily limited to those materials resistant to chipping, cracking, excessive bending and reshaping as a result of ozone, weathering, heat, moisture, other outside mechanical and chemical influences, as well as physical impacts. In particular, a turret assembly 10 of this application may be constructed from materials including, but not necessarily limited to metals, plastics, rubbers, woods, filled composite materials, and combinations thereof. Suitable metals include, but are not necessarily limited to stainless steel, hardened steel, mild steel, aluminum, copper, nickel, brass, and combinations thereof. Metals such as titanium are contemplated but may not be feasible based on material cost. Suitable plastics include, but are not necessarily limited to glass-filled polymers, durable plastic composite materials, and combinations thereof. One suitable glass-filled polymer includes, but is not necessarily limited to glass-filled nylon.

In one particular embodiment of the turret assembly 10, the various component parts of the turret assembly 10 may be machined from solid aluminum and/or steel. In another embodiment, one or more components may be made of plastic or other low-friction material. As appreciated by the skilled artisan, the turret assembly 10 and/or riflescope 500 may be provided in one or more colors including, but not limited to the color black with non-black rotational position markings. One suitable color for rotational position markings such as the zero (0) mark 95, the visual rotation and revolution indicator 96 and the rotation indicator 32 includes the color white, although it is contemplated that one or more other colors or color combinations may be employed.

In another embodiment of the turret assembly 10, it is contemplated that the locking lever 70 may be pivotally attached to the turret cap 20. In this embodiment, the locking lever 70 may be biased toward the carrier member 60 wherein the locking lever 70 is operationally configured to engage the carrier member 60 in a manner effective to provide a locked position of the turret assembly 10.

Although the disclosure is described above in terms of various exemplary embodiments and implementations, it should be understood that the various features and functionality described in one or more of the individual embodiments are not limited in their applicability to the particular embodiment with which they are described, but instead might be applied, alone or in various combinations, to one or more other embodiments whether or not such embodiments are described and whether or not such features are presented as being a part of a described embodiment. Thus, the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like.

Persons of ordinary skill in the art will recognize that many modifications may be made to the present application without departing from the spirit and scope of the disclosure. The embodiment(s) described herein are meant to be illustrative only and should not be taken as limiting the disclosure, which is defined in the claims.

I claim:

1. A turret assembly for an optical aiming device including:
    an adjustable assembly including a cap assembly;
    a locking lever assembly including a pivotal locking lever operationally configured to engage the cap assembly providing a locked position of the turret assembly; and
    one or more key members;
    wherein the cap assembly is operationally configured to direct the pivotal locking lever to a disengaged position providing an unlocked position of the turret assembly;
    wherein the adjustable assembly defines a rotational axis of the turret assembly;
    wherein the adjustable assembly includes a first threaded member rotatable about the rotational axis and a second threaded member rotatable about the rotational axis, the first threaded member having a first thread pitch and the second threaded member having a second thread pitch;
    wherein the one or more key members are operationally configured to couple the first threaded member and the second threaded member in a one-to-one rotational relationship; and
    wherein the one or more key members include planar surfaces and the first threaded member and the second threaded member include keyways operationally configured to receive part of the one or more key members therein.

2. The turret assembly of claim 1 wherein the locking lever assembly is rotationally fixed about the rotational axis.

3. The turret assembly of claim 1 wherein the locking lever assembly is operationally configured to be directed linearly along the rotational axis.

4. The turret assembly of claim 1 wherein the locked position of the turret assembly defines a zero stop position of the turret assembly.

5. The turret assembly of claim 1 wherein rotation of the adjustable assembly provides linear movement of the first threaded member and the second threaded member.

6. The turret assembly of claim 1 wherein the optical aiming device includes a main body including a rotational indicator and the turret assembly further includes one or more locking pins operationally configured to mechanically align the pivotal locking lever with the rotational indicator of the main body.

7. The turret assembly of claim 1 wherein the cap assembly includes one or more engagement surfaces and the pivotal locking lever includes one or more engagement surfaces for contacting the one or more engagement surfaces of the cap assembly.

8. The turret assembly of claim 1 wherein the cap assembly includes one or more planar surfaces and the pivotal locking lever includes one or more planar surfaces for engaging the one or more planar surfaces of the cap assembly.

9. The turret assembly of claim 1 wherein the cap assembly includes a push button operationally configured to direct the pivotal locking lever to a disengaged position providing an unlocked position of the turret assembly.

10. The turret assembly of claim 1 wherein the locking lever assembly includes a biased pivotal locking lever operationally configured to engage the cap assembly providing a locked position of the turret assembly.

\* \* \* \* \*